(12) United States Patent
Kinsella

(10) Patent No.: US 6,914,517 B2
(45) Date of Patent: Jul. 5, 2005

(54) FINGERPRINT SENSOR WITH FEATURE AUTHENTICATION

(75) Inventor: David J. Kinsella, Austin, TX (US)

(73) Assignee: Dalton Patrick Enterprises, Inc., Austin, TX (US)

( * ) Notice: Subject to any disclaimer, the term of this patent is extended or adjusted under 35 U.S.C. 154(b) by 664 days.

(21) Appl. No.: 09/837,757

(22) Filed: Apr. 17, 2001

(65) Prior Publication Data

US 2002/0150282 A1 Oct. 17, 2002

(51) Int. Cl.$^7$ .............................................. G05B 23/00
(52) U.S. Cl. ..................... 340/5.83; 340/5.53; 340/5.52; 340/5.4; 340/5.1; 340/5.81; 345/741; 345/747
(58) Field of Search ............... 340/5.83, 5.52, 340/5.53, 5.4, 5.1, 5.81, 5.82; 238/382; 235/487, 380, 435, 454, 488; 382/115, 116, 124; 356/30; 710/200; 345/741, 747; 341/176

(56) References Cited

U.S. PATENT DOCUMENTS

| | | | |
|---|---|---|---|
| 4,394,773 A | | 7/1983 | Ruell |
| 4,931,629 A | * | 6/1990 | Frankfurt ..................... 235/488 |
| 5,509,083 A | * | 4/1996 | Abtahi et al. ................ 382/124 |
| 5,594,806 A | | 1/1997 | Colbert |
| 5,673,338 A | | 9/1997 | Denenberg et al. |
| 5,745,046 A | | 4/1998 | Itsumi et al. |
| 5,838,306 A | * | 11/1998 | O'Connor et al. .......... 345/163 |
| 5,991,431 A | * | 11/1999 | Borza et al. ................. 382/127 |
| 6,219,793 B1 | * | 4/2001 | Li et al. ...................... 713/202 |
| 6,320,974 B1 | * | 11/2001 | Glaze et al. ................ 382/115 |
| 6,525,932 B1 | * | 2/2003 | Ohnishi et al. ............. 361/686 |
| 6,681,034 B1 | * | 1/2004 | Russo ......................... 382/125 |

* cited by examiner

Primary Examiner—Michael Horabik
Assistant Examiner—Vernal Brown

(57) ABSTRACT

An apparatus and method for providing user access to a secured application. In one exemplary embodiment, a detector apparatus comprises a fingerprint sensor having a receiving portion that is configured to accept an authentication article. The fingerprint sensor detects one or more predetermined features of the authentication article and reads at least a portion of a fingerprint of a user. The authentication article may include a precious gem such as a diamond. The detector apparatus may further comprise a feature detection sensor in operative relation with the fingerprint sensor. The feature detection sensor detects the one or more of the predetermined features. The fingerprint sensor may be detachably coupled to a portable device having an interface for operably communicating with a computer system to determine an identity of the user. A method, comprising: reading the fingerprint of a user with a fingerprint sensor; detecting one or more features of an authentication article with the fingerprint sensor; analyzing at least a portion of the fingerprint to derive a first indication for verifying an identity of the user; analyzing at least one of the one or more features of the authentication article to derive a second indication for authenticating the fingerprint; and combining the first and second indications for selectively providing access to the secured application to the user.

16 Claims, 16 Drawing Sheets

FINGERPRINT SENSOR WITH FEATURE AUTHENTICATION

TECHNICAL FIELD OF THE INVENTION

This invention is related to sensors, and more particularly to sensors providing user information including fingerprint information and authentication article feedback to an attached electronic system for verifying the fingerprint information.

BACKGROUND OF THE INVENTION

Modern society demands that people may be identified for many reasons. These include limiting access to bank accounts, limiting access to certain facilities such as a security area, a computer room, a police department, or a military facility, limiting which people are authorized to pick up a child from a day care center, limiting access to government welfare checks and health benefits, determining which prisoner to parole, and limiting access to adult activities such as electronic gambling. This has led to increasing use of identification cards, passwords, and PIN numbers to supplement, in those instances where automated identification is either necessary or desirable, those situations where human recognition is either unavailable or will not suffice. This obviously results in an increasing array and assortment of various cards, passwords, and PIN numbers that active participants in today's increasingly electronic society must carry with them (or ideally must memorize) to be able to access the functions and capabilities requiring such identification and verification.

Biometrics is the study of biological phenomena, and in the area of personal identification, some chosen characteristic of a person is used to identify or verify that person's identity. Biometric identification has gained interest in recent years because certain personal characteristics have been found to be substantially unique to each person and difficult to reproduce by an impostor. Further, the recording and analysis of biometric data is generally susceptible to automation owing to the increased use of computer-controlled electronics and digital recording techniques. Biometric systems are automated methods of verifying or recognizing the identity of a living person on the basis of some physiological characteristic like a fingerprint or iris pattern, or some aspect of behavior like handwriting or keystroke patterns.

The biometric identifying characteristic may be biologically determined as with a fingerprint, or it may be some characteristic that is learned or acquired, such as handwriting or voice patterns. Ideally, the characteristic should be unique for every person and unvarying over the time frame during which the person may be tested for identification. The characteristic should also be difficult to duplicate by an impostor in order to secure against erroneous identification.

Some of the biometric characteristics most investigated today for use in a personal identification system include fingerprints, hand or palm prints, retina scans, signatures and voice patterns. Hand or palm print techniques typically evaluate the shape of a person's hand or other significant features such as creases in the palm, but these techniques may be fooled by templates or models of the hand of an authorized person. Retina scanning techniques evaluate the pattern of blood vessels in a person's retina. A drawback of this technique is that the blood vessel pattern may vary over time, e.g., when alcohol is in the blood stream or during irregular use of glasses or contact lenses. Also, a user may feel uneasy about having his or her eye illuminated for retina scanning or the possibility of eye contamination if there is contact between the eye and the scanning apparatus. Signatures can be forged easily and must usually be evaluated by a human operator, although work has been done on automated systems that evaluate the dynamics of a person's handwriting, such as the speed and the force of hand movement, pauses in writing, etc. Using voice patterns as the identifying characteristic encounters difficulties owing to the wide variations in a person's voice over time, the presence of background noise during an evaluation and the potential for an impostor to fool the system with a recording of the voice of an authorized person.

The most commonly used biometric characteristic and the one that has been the most investigated and developed is, of course, the fingerprint. Up until now, the technology of personal identification through fingerprint analysis has been used mainly in law enforcement, and this long term experience with fingerprint analysis has developed a large amount of information about fingerprints and has confirmed the uniqueness of a person's fingerprints. Historically, in law enforcement, fingerprints have been recorded by inking the fingerprint and making a print on a card for storage.

A fingerprint identification system is described in an article entitled "Vital Signs of Identity" by Benjamin Miller (IEEE Spectrum, February 1994, pp. 22–30). The system for recognizing fingerprints requires the user to press a finger onto a glass or Plexiglas platen. Image sensors under the platen and a charge-coupled device (CCD) array capture the fingerprint image. A custom computer system and software analyses the digitized image and converts it to an approximately 1 K mathematical characterization which is compared against data stored in the local terminal or in networked versions of the system in a remote personal computer.

Rather than requiring a user to explicitly engage with verification devices, transparent verification attempts to identify the identity of a user not only unobtrusively, but during a transaction and using normal user interactions with the system. For example, a voice recognition system which also is able to identify a user by his voice pattern provides a capability of identifying a user as the user is speaking a request or command to the system, rather than as an explicit identification action or request by the user.

U.S. Pat. No. 5,229,764 to Matchett et al. describes a continuous biometric authentication matrix. This system activates and analyzes the biometric data from a plurality of biometrically-oriented personal identification devices at intermittent intervals and selectively allows or prevents continued use of a particular protected system or device by a particular individual. The system acts as a continuously functioning gate between a system to be protected and a prospective user. Many of the biometrically-oriented personal identification devices in the Matchett system attempt some degree of transparent verification and include thumbscan, digital photo, voice prints, fingerprints and others. One such device is a joystick device shown in FIG. 7 incorporating a thumbscan sensor on the top end of the joystick. In FIG. 8A a computer mouse is depicted carrying a hand geometry reader in a mouse casing. The hand geometry reader is wired through the mouse and its leads run back to the rest of the scanning unit along the same conduit PG as that of the mouse. FIG. 8B depicts a mouse having a thumbscan unit sensor incorporated into its side. The thumbscan sensor may be oriented relative to a mouse casing adapting it either for right-handed persons or left-handed persons or both. A mouse lead is modified or replaced to carry both the mouse data and the sensor data.

A pointing device such as a computer mouse, joystick, or trackball, includes two principal components: a positional indicator allows movement by a user to be communicated as user positional information to an attached system (e.g., a computer system) to allow, for example, a pointer to be moved around a window or a screen of a graphical user interface; and input switches or buttons so that a user can provide selection information to the system which corresponds to a particular location to which the positional indicator has been moved. Both kinds of information are communicated through a typically small cable to the system to which the pointing device is attached. Alternatively, infrared beams and RF interfaces have also been used to allow for wireless pointing devices, particularly a wireless mouse.

Notwithstanding these devices, there is a need for additional and improved verification devices and capabilities for electronic systems, particularly those verification devices that provide for transparent continuous verification during normal user interactions with the system.

As all fingerprints are unique, which makes them ideal for personal identification. In addition, unlike passwords, PIN codes and/or smart cards, fingerprints are impossible to lose or forget, and they can never be stolen. Therefore, reading and comparing fingerprints is a reliable and widely used technique for personal identification or verification to provide a controlled access to a secured environment. In particular, a common approach to fingerprint-based user identification involves scanning one or more fingers for a fingerprint and storing the unique characteristics of the fingerprint image. The characteristics of a fingerprint may be compared to information for reference fingerprints already in a database to determine proper identification of a person, such as for verification purposes.

Prior art biometric sensors such as fingerprint sensors for reading fingerprints are known to those skilled in the art. As in most fingerprint sensors, when activated, it is desirable that the fingerprint may be properly read. For instance, a typical electronic fingerprint sensor is based upon illuminating the finger surface using visible light, infrared light, or ultrasonic radiation. The reflected energy is captured with some form of camera, for example, and the resulting image is framed, digitized and stored as a static digital image. Then, a fingerprint image and the fingerprint details may be used to determine a match with a database of reference fingerprints.

However, a fingerprint-based identification system having fingerprint sensor(s) may be fooled by an image of the fingerprint. Thus, compromising access to a secured environment. For example, presentation of a photograph or printed image of a fingerprint rather than a fingerprint from a user's finger may deceive optical sensing. Accordingly, a fingerprint sensor reading only a fingerprint may be unreliable in providing controlled access to a secured application, system, or device.

One solution includes the combination of a card bearing user information, along with sensing of the fingerprint from a user's finger to verify the identity of the card bearer. For example, fingerprint information may be encrypted onto a card so that a comparison of the information read from the card can be made to a fingerprint from a user's finger of the card bearer. Accordingly, the identity of the user and card bearer can be verified, such as for authorizing an access to a secured application. Such use of a fingerprint sensor may reduce fraud while providing access to a secured application.

A problem with this technology has been that such conventional systems are relatively complicated and require the use of a separate card reader, such as for reading a magnetic stripe carried by the card, as well as a separate fingerprint reader to obtain the fingerprint from the user's finger. Accordingly, such a dual sensor system is relatively expensive and may be complicated. Therefore, what is required is a solution that enables increased security without the expense of additional hardware.

Another problem with this technology has been that in fingerprint-based access control systems, authorization or access by an authorized person, other than the person with the matching fingerprint, can be difficult to implement using a conventional fingerprint sensor. Therefore, what is also required is a solution that provides for improved security.

One unsatisfactory approach, in an attempt to solve the above-discussed problems typically involves using a large and bulky sensor integrated with a fingerprint sensor. However, a disadvantage of this approach is that a relatively large and/or bulky fingerprint sensor results having cumbersome peripherals to carry around. Therefore, what is also needed is a solution that meets the above-discussed requirements in a more effective manner.

Heretofore, the requirements of providing more secure access to a controlled environment without compromising security and/or portability referred to above have not been fully met. What is needed is a solution that simultaneously addresses all of these requirements.

SUMMARY OF THE INVENTION

The present invention generally provides an apparatus and method for verifying a fingerprint with a fingerprint of an authentication article to authenticate the fingerprint. In one exemplary embodiment, a detector apparatus may include a fingerprint sensor having a receiving portion that is configured to accept an authentication article including a precious gem such as a diamond. The fingerprint sensor may detect one or more predetermined features of the authentication article, and read at least a portion of a fingerprint of a user. The detector apparatus may further comprise a feature detection sensor in operative relation with the fingerprint sensor. The feature detection sensor detects one or more of the predetermined features. The fingerprint sensor may be detachably coupled to operate with a portable device such as a smart card having an interface for operably communicating with a computer system, and a verification engine for operably communicating with the computer system for determining an identity of the user. The verification engine may include a database having a user storage, an authorization profile storage, and an audit log storage.

In one another embodiment of the present invention, a pointing device may include an interface for operably communicating with a computer system. The pointing device may further include a base, a trackball mounted upon the base, an upper section, said upper section including at least one button formed substantially on a top surface of the upper section, and a fingerprint sensor having a receiving portion that is configured to accept an authentication article. The fingerprint sensor is mounted within the upper section for detecting one or more predetermined features of the authentication article and for reading at least a portion of a fingerprint of a user's finger in response to the finger positioned adjacent to the fingerprint sensor and the authentication article disposed in proximity to the receiving portion and readable by the fingerprint sensor.

The pointing device may further include a feature detection sensor in operative relation with the fingerprint sensor. The feature detection sensor detects one or more of the predetermined features, or any combination thereof of the authentication article. The pointing device may further include a verification engine in operative relation with the computer system, the fingerprint sensor, and the feature detection sensor for determining an identity of the user. The fingerprint sensor may provide a first signal to the verification engine, which is derived from the portion of the fingerprint. Likewise, the feature detection sensor may provide a second signal to the verification engine, which is derived from at least one of the one or more predetermined features of the authentication article.

The verification engine may comprise a database having a user storage, an authorization profile storage, and an audit log storage. The verification engine may further comprise a comparator engine for comparing the first signal indicative of the at least portion of the fingerprint with a first authentication signal corresponding to a stored copy of the fingerprint within the database. The comparator engine may compare the second signal indicative of the at least one of the one or more predetermined features of the authentication article with a second authentication signal corresponding to a stored copy of the one or more predetermined features of the authentication article within the database to provide an authorization signal for a secured application which is communicatively coupled to the computer system. The authorization signal may selectively provide an access to the secured application to the user.

In one embodiment, the fingerprint sensor is located beneath a particular one of the button positions. And the fingerprint sensor includes a capacitive imaging array located at the particular button position contactable by the user's finger so that the user's fingerprint may be imaged by the capacitive imaging array. Alternatively, the fingerprint sensor can be incorporated into an operable button located at the particular button position. The fingerprint sensor may include an optical imaging array and the particular button position includes a transparent material through which the user's fingerprint may be imaged by the imaging array. The pointing device may further comprise one or more additional biometric sensors in operative relation with the fingerprint sensor.

In another embodiment of the present invention, a detector apparatus includes a fingerprint sensor for reading a fingerprint of a user and a feature detection sensor having a housing that is configured to receive an authentication article to the user. The feature detection sensor detects one or more predetermined features of said authentication article and is in operative relation with the fingerprint sensor to identify the user responsive to the fingerprint and at least one of the one or more predetermined features from the authentication article.

In yet another embodiment of the present invention, a detector apparatus includes a fingerprint sensor disposed at a location such that when operating the apparatus in a normal manner, a user's finger of a user's hand rests in proximity to and readable by the fingerprint sensor for reading a user's fingerprint, and a feature detection sensor in operative relation with the fingerprint sensor and having a housing that is configured to receive an authentication article. The feature detection sensor being configured to detect one or more predetermined features of the authentication article. The detector apparatus identifies the user according to the fingerprint and at least one of the one or more predetermined features from the authentication article.

In still another embodiment of the present invention, a method for providing user access to a secured application, comprising: (a) reading the fingerprint of a user with a fingerprint sensor; (b) detecting one or more features of an authentication article with the fingerprint sensor; (c) analyzing at least a portion of the fingerprint to derive a first indication for verifying an identity of the user; (d) analyzing at least one of the one or more features of the authentication article to derive a second indication for authenticating the fingerprint; and (e) combining the first and second indications for selectively providing access to the secured application to the user.

In one another embodiment of the present invention, a method comprising: (a) reading a fingerprint of a user; (b) detecting one or more features of a precious gem; (c) analyzing the fingerprint to derive a first indication; (d) analyzing the one or more features of the precious gem to derive a second indication; and (e) combining the first and second indications for verifying an identity of a user. The act of reading the fingerprint may include plugging in a fingerprint sensor having a first surface into a smart card and positioning a finger proximal to the first surface of said fingerprint sensor. The act of detecting one or more features may include positioning the precious gem into a slot located proximal to the first surface of the fingerprint sensor, and reading a feature print of the precious gem to derive the one or more features of the precious gem. The act of combining the first and second indications may include deriving an authorization for the user by authenticating the fingerprint thereof with the featureprint of the precious gem to selectively provide an access to a secured application to the user.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following descriptions taken in conjunction with the accompanying drawings, in which:

FIGS. 13A, 13B, 13C and 13D are an electronic schematic drawing of video circuitry depicted in FIG. 10.

The use of the same reference symbols in different drawings indicates similar or identical items.

DETAILED DESCRIPTION

The invention is generally directed to improving access to a secured entity through biometrics. In particular, a detector apparatus and method for providing user access to a secured application is disclosed. A user fingerprint is read in combination with one or more features of an authentication article, including a precious gem or stone such as a diamond, which is being employed to authenticate the user fingerprint. Such a combination of features termed as a featureprint may substantially increase security while providing access to a secured application with the use of a fingerprint recognition device such as a fingerprint sensor.

Figure 1A:
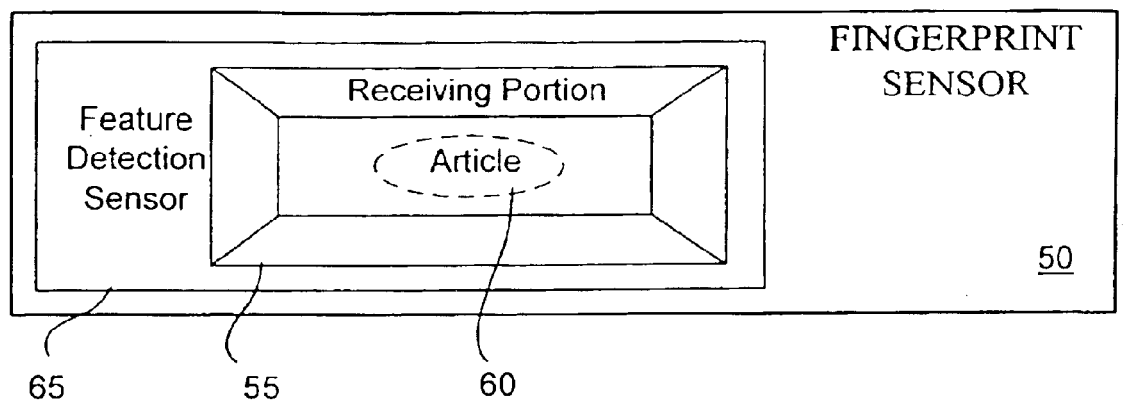
FIG. 1A is a top view of one embodiment of a fingerprint sensor in accordance with one aspect of the invention.

FIG. 1A is a top view of one embodiment of a fingerprint sensor 50 in accordance with one aspect of the invention. The fingerprint sensor 50 may comprise a receiving portion 55 that is configured to accept an authentication article 60. The authentication article 60 may be disposed in proximity to the receiving portion 55 and readable by the fingerprint sensor 50. Upon receipt of the authentication article 60, the fingerprint sensor 50 detects one or more predetermined features of the authentication article 60 while reading at least a portion of a fingerprint of a user's finger in response to the finger positioned adjacent to the fingerprint sensor 50. The fingerprint sensor 50 may further comprise a feature detection sensor 65 that is in operative relation with the fingerprint sensor 50. The feature detection sensor detects the one or more predetermined features, or any combination thereof of the authentication article 60.

Figure 1B:
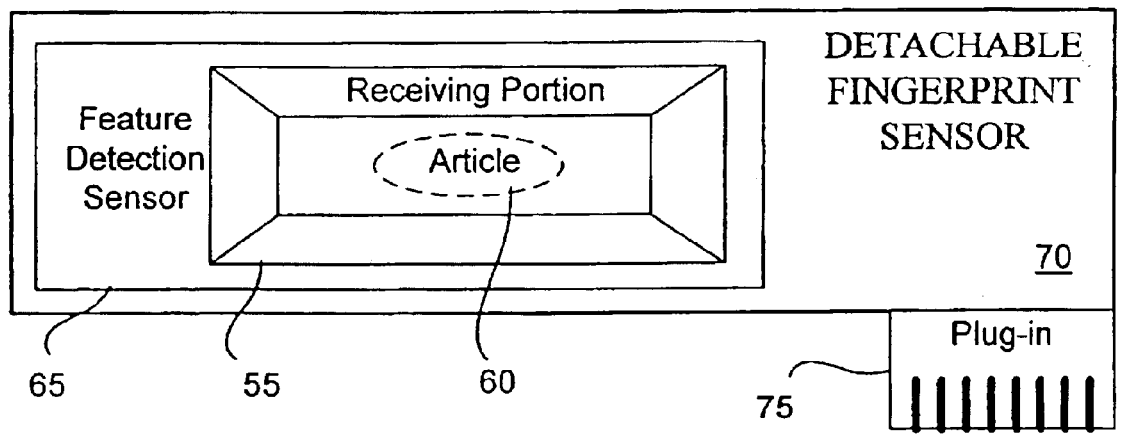
FIG. 1B is a top view of one embodiment of a detachable fingerprint sensor according to another aspect of the invention.

FIG. 1B is a top view of one embodiment of a detachable fingerprint sensor 70 according to another aspect of the invention. The detachable fingerprint sensor 70 may comprise a plug-in interface 75 to communicate fingerprint information associated with the fingerprint of a user's finger and feature information associated with the authentication article 60 to an associated system such as a computer system (not shown). It is to be understood that the associated system could be any conventional system having appropriate fingerprint-analyzing means for verifying the at least a portion of a fingerprint of a user's finger. In addition, the associated system could include feature-analyzing means for detecting the one or more predetermined features, or any combination thereof of the authentication article 60.

Figure 1C:
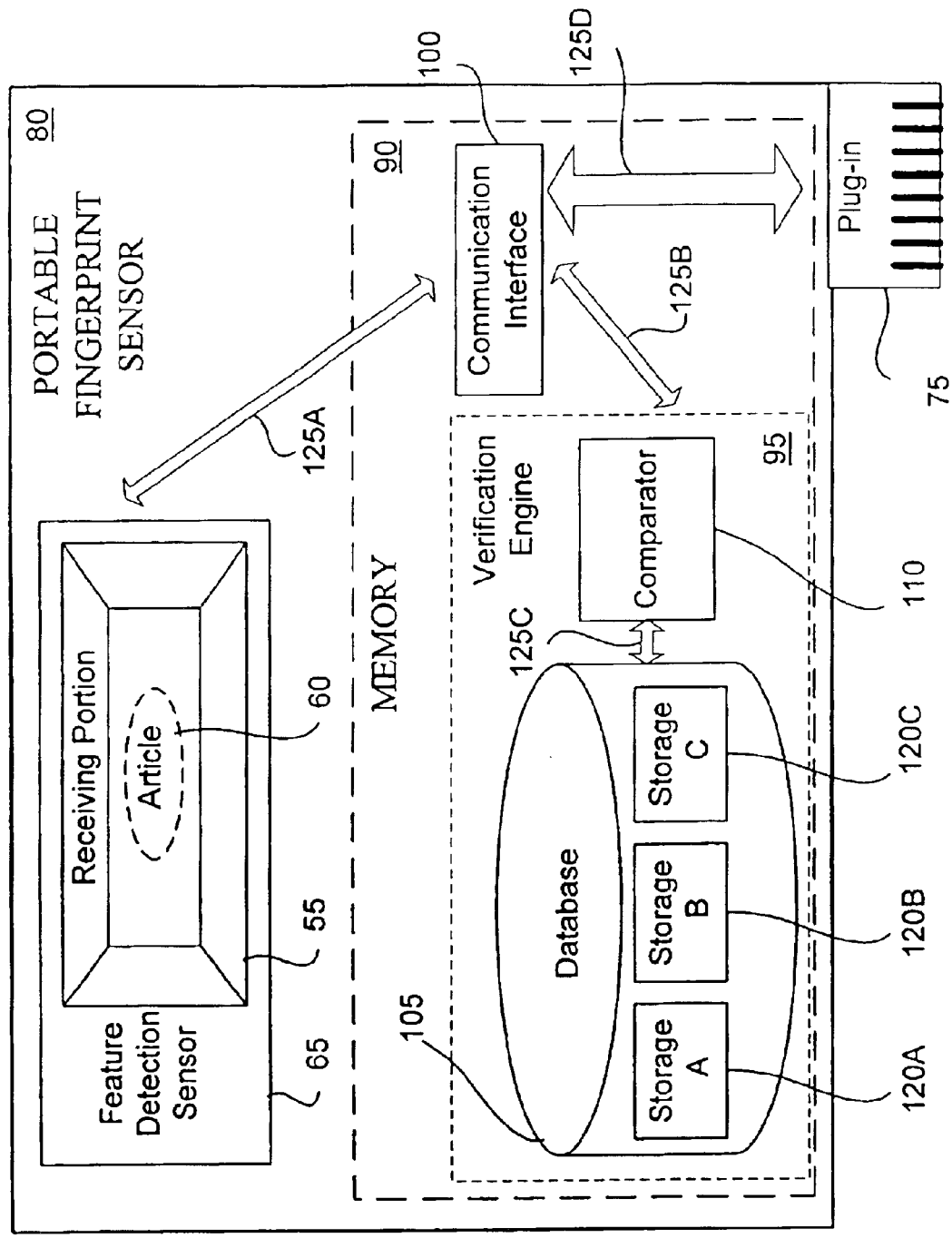
FIG. 1C is a top view of one embodiment of a portable fingerprint sensor consistent with yet another aspect of the invention.

FIG. 1C is a top view of one embodiment of a portable fingerprint sensor 80 having a memory 90 consistent with yet another aspect of the invention. The portable fingerprint sensor 80 may be detachably coupled to operate with a portable device including a smart card (not shown). As the portable fingerprint sensor 80 is detachable, it may be configured to operate with a variety of portable devices such as a camera, binocular, and telephone. The memory 90 may comprise a verification engine 95 for operably communicating with a computer system (not shown). A communication interface 100 may be employed for operably communicating with the computer system for determining an identity of the user by verifying the fingerprint and undergoing subsequent authentication thereof with the one or more predetermined features, or any combination thereof of the authentication article 60. For example, the portable fingerprint sensor 80 may be removablly attached to operate with a computer mouse or a trackball having a suitable interface for operably communicating with a computer system.

In one embodiment, the verification engine 95 may comprise a database 105 and a comparator 110. The database 105 may include a storage A 120A for having user information, a storage B 120B for keeping authorization profile, and a storage C 120C for maintaining audit log. Further, the feature detection sensor 65 could be configured to accept a precious gem including a diamond having the one or more predetermined features including weight, size, and/or shape or form as profile of the exterior surface. For example, the verification engine 95 may employ a weight parameter for the weight, a size parameter for the size, and an exterior surface profile parameter for the shape or form of the diamond as the predetermined features to authenticate the fingerprint. It is to be understood that any known one or more communication protocols may be employed for communicating input fingerprint and feature information to the communication interface 100 over link 125A, for bi-directional internal communication between verification engine 95 and the communication interface 100 over link 125B and/or for bi-directional external communication over link 125C between communication interface 100 and the plug-in interface 75.

Currently, many controlled access systems rely on portable verification articles to provide an additional level of user verification based on something tangible such as a pre-issued physical item to a particular authorized user in conjunction with something non-tangible such as a pre-issued password to same user. Such portable verification articles could be physical devices that individuals may carry. This allows for an inexpensive way of verifying users requiring entering a password and presenting a portable verification article. For example, a smart card being a portable device having a memory and/or a microprocessor is used as a portable verification article. When inserted or positioned near a smart card reader, the card communicates with the reader to transfer data or perform desired functions.

However, a variety of such portable verification articles are currently available in the marketplace including smart cards, but the controlled access systems are always vulnerable to various attacks by hackers as electronic data and information stored on the smart cards can be easily stolen for potential misuse thereof. Thus, while using a portable verification article to provide verification, an authentication process can be employed to provide a relatively more secured access for communication such as over a network.

Accordingly, the portable fingerprint sensor 80 may be coupled to operate with a smart card having a communication interface for operably communicating with a computer system. To this end, the portable fingerprint sensor 80 may employ the verification engine 95 for operably communicating with the computer system in order to determine the identity of the user bearing the smart card by first verifying the fingerprint and then authenticating the verified fingerprint with an authentication article to provide an additional level of security.

The invention also contemplates a fingerprint sensor (or other biometric-type sensor) that is removable. Being a detachable fingerprint sensor (for connection with a smart card or other device), the fingerprint sensor could be portable and can be plugged into numerous other devices. In one embodiment, the detachable fingerprint sensor can be plugged into a smart card. In another embodiment, it could be plugged into a mouse or track ball. In other embodiments, it could be plugged into a camera, binoculars, telephones, or any other device.

Figure 2:
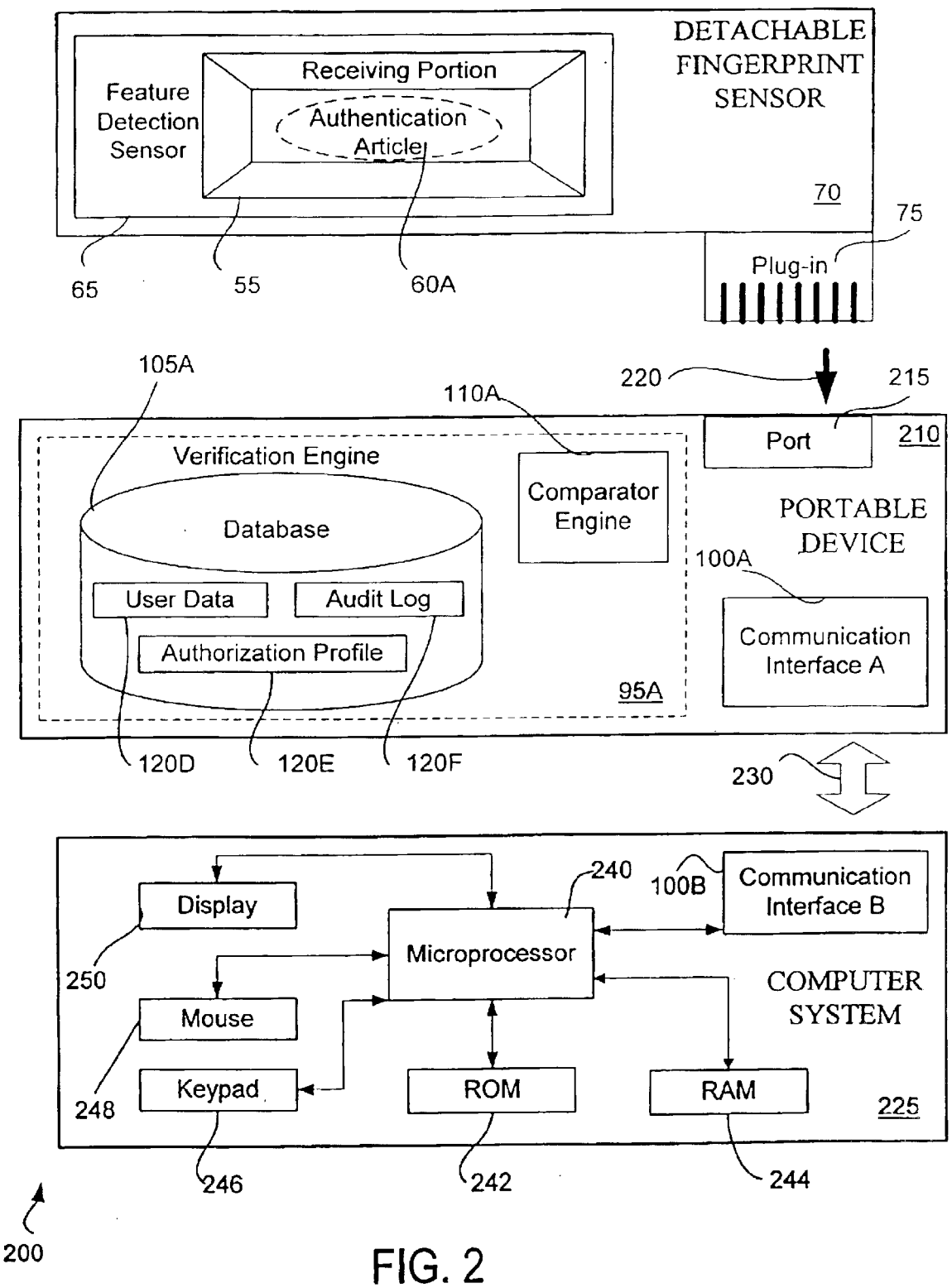
FIG. 2 is a block diagram of a system incorporating the fingerprint sensor shown in FIG. 1B in accordance with a further aspect of the invention.

FIG. 2 is a block diagram of a system 200 incorporating the detachable fingerprint sensor 70 of FIG. 1B in accordance with a further aspect of the invention. The system 200 may include a portable device 210 having a port 215 to receive the plug-in interface 75 therein as indicated by an arrow 220. The portable device 210 may comprise a memory device such as a memory stick having a ROM generally integrated with a smart card (not shown). The portable device 210 may further comprise a verification engine 95A in operative relation with a computer system 225, the detachable fingerprint sensor 70, and the feature detection sensor 65 for determining an identity of the user. For operably communicating with the computer system 225 over a communication link 230, the portable device 210 may further comprise a communication interface A 100A.

The verification engine 95A may comprise a database 105A having a user data 120D, an authorization profile 120E, and an audit log 120F and a comparator engine 110A for comparing a first signal indicative of the at least portion of the fingerprint with a first authentication signal corresponding to a stored copy of the fingerprint within the database 105A. Likewise, a second signal indicative of the at least one of the one or more predetermined features of an authentication article 60A may be compared with a second authentication signal corresponding to a stored copy of the one or more predetermined features of the authentication article 60A within the database 105A to provide an authorization signal for a secured application (not shown) which is communicatively coupled to the computer system 225. The authorization signal selectively provides an access to the secured application to the user.

The detachable fingerprint sensor 70 may provide the first signal to the verification engine 95A. The first signal may be derived from the portion of the fingerprint. And the feature detection sensor 65 may provide the second signal to the verification engine 95A. The second signal may be derived from at least one of the one or more predetermined features of the authentication article 60A.

For appropriate communication, the computer system 225 may include a communication interface B 100B to communicate with the portable device 210. In addition, to perform desired processing, the computer system 225 may further include a microprocessor 240, a ROM 242, a RAM 244, a keypad 246, a mouse 248, and a display 250. As persons skilled in the art will recognize that any suitable computing system may be deployed without departing from the spirit of the present invention.

In one another exemplary embodiment, the computer system 225 being a biometric system may include a memory to store a biometric server engine having standard biometric functions for implementing one or more biometric algorithms, and a fingerprint recognition device coupled to a biometric database having fingerprint recognition reference data and precious gem feature reference data. The fingerprint recognition device may comprise a sensor chip and a biometric interface.

For authentication, the sensor chip and biometric interface may verify fingerprints and physical attributes of a pre-issued precious gem to authenticate a fingerprint of an authorized user to provide an access to a secure application or a secured system. For example, along with recognizing fingerprints the number of exterior surfaces of the pre-issued precious gem may be detected for providing the access to the authorized user of the secure application. However, the physical attributes of the pre-issued precious gem may be desired to be read or sensed either to authenticate the user when providing access to the secure application the very first time or while adding/deleting access rights to a new/old user, respectively. Physical attributes of the pre-issued precious gem could include, but not limited to size, weight, and number of exterior surfaces.

In operation, the authentication may be performed by using an authorization algorithm with the biometric server engine. Accessing the fingerprint recognition reference data and gem geometric reference data from the database to compare with the fingerprint read along with one or more features detected from the pre-issued precious gem from the fingerprint recognition device. For example, a predetermined physical attribute of a diamond can be read for authenticating a user the first time to provide an access to the secured application to the user. Once the user is authenticated, any subsequent access may be provided to the user with simply reading the fingerprint. As an example, after a grant of an initial access to the secure application or system the user could keep the diamond in a secure place. A variety of applications are contemplated for the present invention including with smart or magnetic cards. This invention incorporates the fingerprint sensor described above along with verification software that track the transactions attempted and entered into the user. Accordingly, a detachable fingerprint sensor along with an audit trail may be readily devised.

The (detachable or permanent) fingerprint sensor may be equipped with a receiving slot or portion that is configured to accept a precious gem, such as a diamond. In operation, a user could plug in the fingerprint sensor into a device. The user would then position a precious gem such as a diamond into the center (or other area) of the fingerprint sensor. The user could then place his/her finger over the fingerprint sensor, including the diamond. The verification software within a smart card interfacing with a computer system could then read the "fingerprint" of the diamond, the human fingerprint, or some combination of the two. The presence of the diamond increases the level of security because one would need to steal both a user's fingerprint and the actual precious gem in order to gain illegal access to the device.

Other implementations may include a fingerprint sensor/chip installed on a smart card for use with a pre-issued diamond (or any precious gem/stone). The fingerprint sensor/chip having an audit trail could also be readily devised. Such embodiments consistent with the present invention may provide adequate user verification and subsequent authentication to improve the level of security for information accessed by individuals over a communication medium such as a network. The authentication techniques described herein may allow a system user to customize their level of authentication based on the type of authentication article used and the available software on the workstation and server. For example, the workstation and server may provide increased levels of verification and subsequent authentication using encryption techniques.

Figure 3:
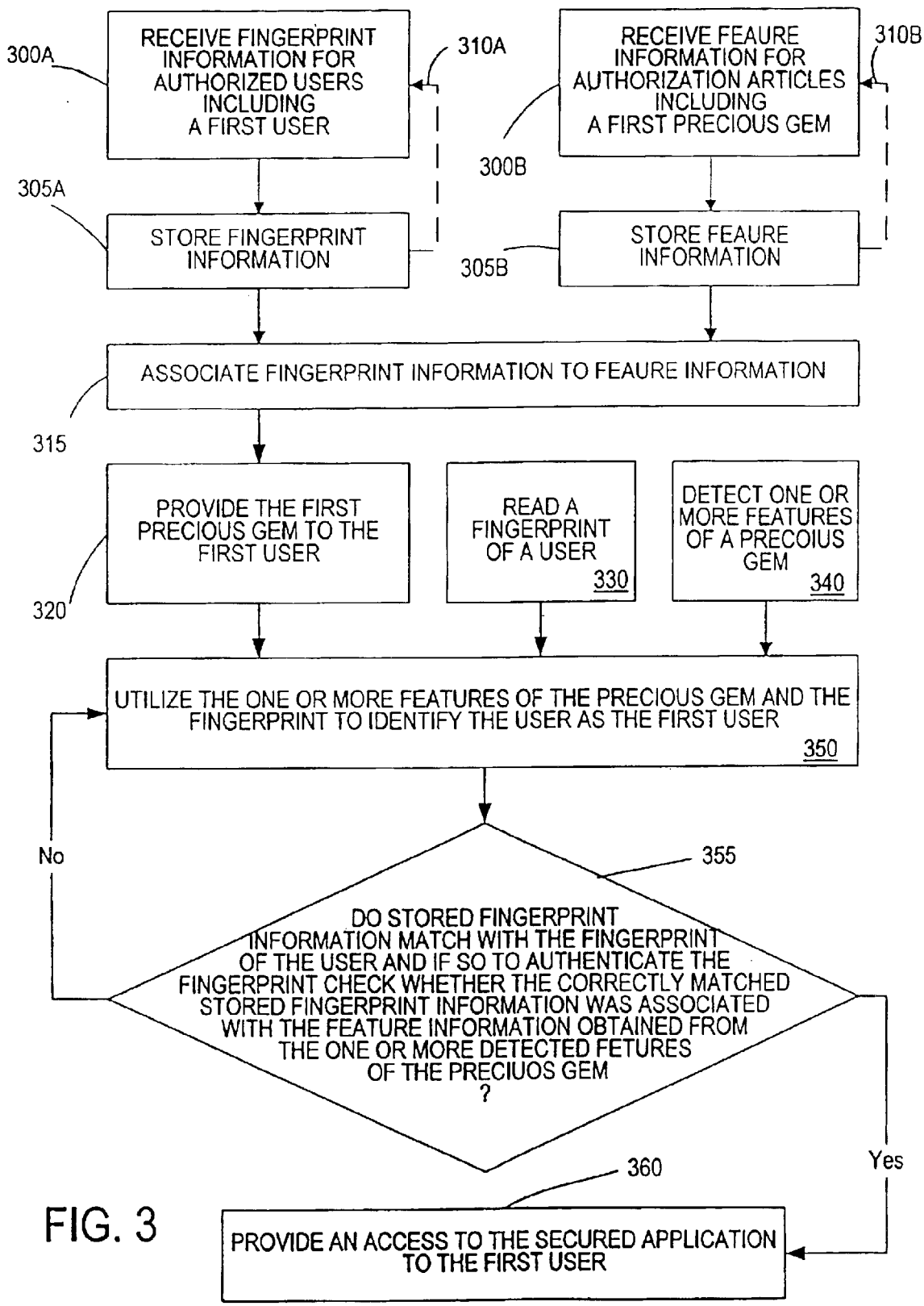
FIG. 3 is a flow diagram of a process that can be implemented by a computer program, representing an exemplary embodiment of the invention.

FIG. 3 is a flow diagram of a process that can be implemented by a computer program, representing an exemplary embodiment of the invention. In step 300A, fingerprint information for authorized users including a first user may be received. The fingerprint information can be readily stored in the database 105A in step 305A. A first dotted arrow 310A from step 305A to 300A indicates that such stored fingerprint information may be periodically revised, if desired. Likewise, feature information for authorization articles 60A including a first precious gem may be received in step 300B. This feature information can be readily stored in the database 105A in step 305B. Again, a second dotted arrow 310B from step 305B to 300B indicates that such stored feature information may be selectively updated or manipulated, if desired.

At step 315, the fingerprint information may be associated to the feature information for each authorized user. Each authorized user may be issued the authentication article 60A such as a first precious gem to the first user being provided in step 320. In step 330, for verification purposes reading of a fingerprint of a user through the detachable fingerprint sensor 70 may be performed. Similarly, at step 340, by utilizing the detachable fingerprint sensor 70, one or more features of the authentication article 60A may be detected for authenticating the fingerprint. To identify the user as the first user, the verification engine 95A may utilize the one or more features of the precious gem and the fingerprint in step 350.

A comparison test may be performed in step 355 by verification engine 95A. The comparison test determines whether the fingerprint obtained in step 330 matches with the stored corresponding fingerprint information. And if so, to authenticate the fingerprint, a further check is performed as to whether the correctly matched stored fingerprint information was associated earlier in step 315 with the feature information obtained from the one or more detected features of the precious gem in step 340. If this comparison test is affirmative, the verification may proceed to step 360. Accordingly, in step 360, an access to a secured application may be provided to the first user. Conversely, if no match is detected, step 350 may be repeated. If no conclusive match is found, the verification may terminate waiting for a next cycle of the process to begin.

Figure 4A:
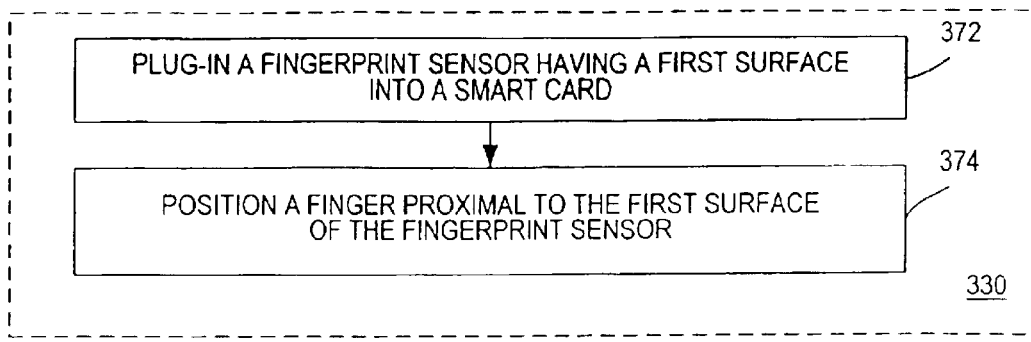
FIG. 4A is a flow diagram with exemplary details for the fingerprint reading process depicted in FIG. 3.
Figure 4B:
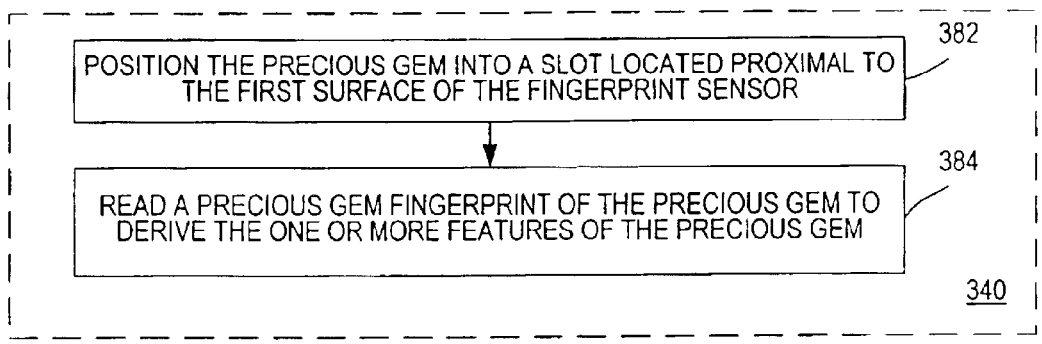
FIG. 4B is a flow diagram with exemplary details for the feature detection process depicted in FIG. 3.
Figure 4C:
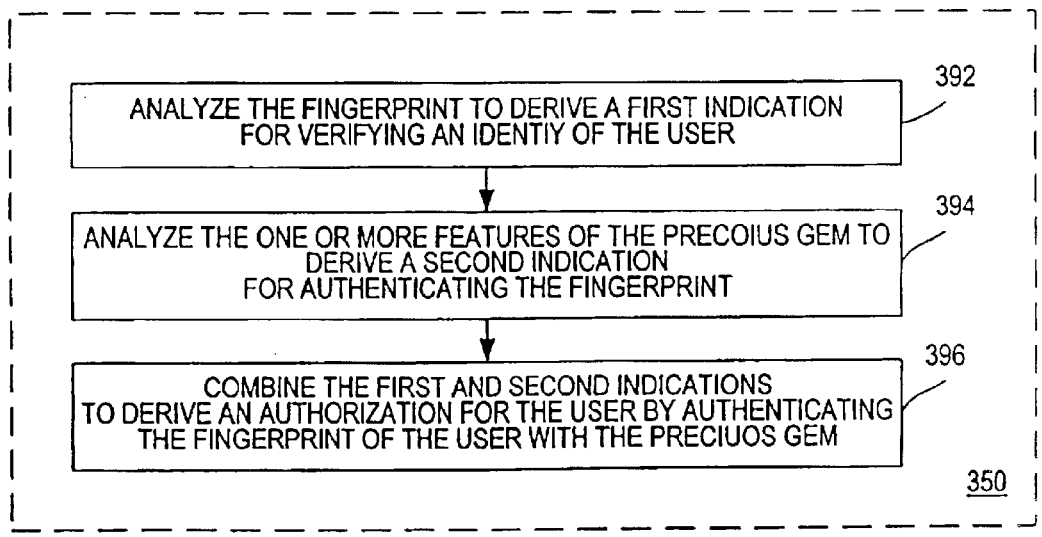
FIG. 4C is a flow diagram with exemplary details for the fingerprint and feature information analysis process depicted in FIG. 3.

FIGS. 4A, 4B, and 4C show a flow chart of exemplary steps embodying verification process consistent with one aspect of the present invention. With reference to FIGS. 3 and 4A, for step 330, the detachable fingerprint sensor 70 having the receiving portion 55 may be plugged-in into a smart card in step 372. In step 374, a user may position a finger proximal to the receiving portion 55 for reading of at least a portion of the fingerprint. Referring to FIGS. 3 and 4B, for step 340, detecting one or more features includes positioning the authentication article 60A such as the precious gem into the receiving portion 55 in step 382 and reading a precious gem fingerprint of the precious gem to derive at least one or more features of the precious gem in step 384. With reference to FIGS. 3 and 4C, for step 350, the verification engine 95A analyzes at least a portion of the fingerprint to derive a first indication for verifying an identity of the user in step 392. Next, in step 394, the one or more features of the authentication article 60A may be analyzed to derive a second indication for authenticating the fingerprint. Then at step 396, the first and second indications may be combined to derive an authorization for the user by authenticating the fingerprint of the user with the authentication article 60A.

Figure 5:
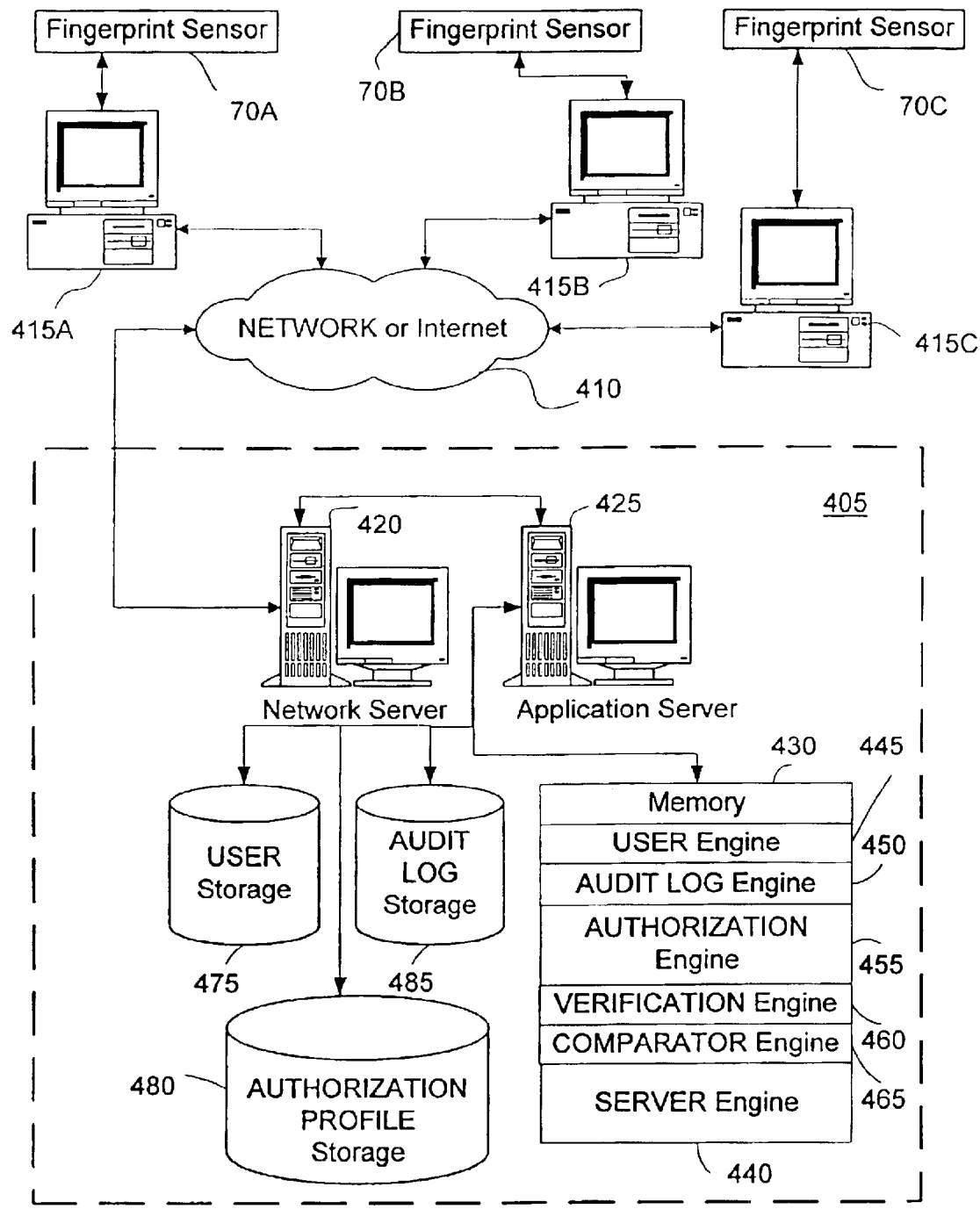
FIG. 5 exemplary hardware/software components of a system incorporating the detachable fingerprint sensors of FIG. 1B in accordance with a still further aspect of the invention.

FIG. 5 shows exemplary hardware/software components in a system 400. The system 400 generally incorporates an array of fingerprint sensors 70A through 70C shown in FIG. 1B to provide controllable access to a secured application executed from an information processor 405 using Internet 410 in accordance with one aspect of the invention. An individual may use a first computer, such as an IBM compatible computer 415A, 415B, or 415C, to access over a computer network, such as the Internet 410, the secured application from the information processor 405 that preferably services multiple first authorized users. Those skilled in the art will appreciate that other computer networks can be readily substituted for the Internet 410.

The information processor 405 may include a network server 420, such as a Sun Solaris UltraSparc Server, executing communications software, such as Apache HTTPD Server from The Apache Group, www.apache.org, to communicate over computer network including Internet 410. Also at the information processor 405 may be an applications server 425 having the one or more secured applications, preferably operating behind a firewall, in data communications with network server 420 and having a memory 430 that contains software used in the present invention. Such software may include a server engine 440, for generating and processing access requests, and a user engine 445, an audit log engine 450, an authorization engine 455, a verification engine 460, a comparator engine 465 in data communications with applications server 425 executing the one or more secured applications. The software operating on the applications server 425 and network server 420 communicate with each other and with necessary databases using standard protocols, such as HTTP, CGI or Apache API. Skilled persons will understand that additional or different servers may be suitably deployed.

The authorized users could be part of a single enterprise and connected to processor over a local area network, a wide area network, or an Intranet. Alternatively, the information processor 405 could service many unrelated first individuals, each having appropriate access to the one or more secured applications. The access may be determined from the content of user database 475, an authorization profile database 480 and/or an audit log database 485 being accessible through information processor 405. Typically, many users could continually generating access requests and posting them over computer network such as Internet 410.

To provide access, verification engine 460 compares the content of an access request, having the fingerprint and feature information, sent to the information processor 405 with the contents of the user database 475, the authorization profile database 480 and/or the audit log database 485. If the access request content does not match with the content in the databases 475, 480, and/or 485, the system 400 may acknowledge receipt of the access request with no data returned.

Conversely, if the access request meets predefined criteria, an access authorization to the one or more secured applications may be accordingly returned to the requesting user. Although the method of determining the recipient of the access authorization may be pre-specified, the actual recipient of the access authorization may depend upon the content of a user-provided fingerprint and feature information, and may not, therefore, be known before the content of the user-provided fingerprint and feature information is analyzed.

The form and content of an access authorization to a user in response to an access request may be determined, in accordance with any suitable notification specification. The user may be notified electronically such as by an electronic message. The access authorization may include sending a copy of an entire secured application that matched the criteria. The access authorization may include sending data and/or information that is determined by, or includes content from the secured application that meets the criteria.

One skilled in the art will appreciate that system 400 may include any number of computers or workstations, servers, and other network components. Computers 415A, 415B, and 415C are capable of sending data to and receiving data from Internet 410. Each computer 415A, 415B, and 415C includes a processor, memory, and input/output devices to facilitate user interfacing. Each computer 415A, 415B, and 415C also includes software for implementing the fingerprint and feature verification/authentication techniques described herein. Moreover, each computer 415A, 415B, and 415C includes a communication device such as a modem or other communications devices to transfer data over Internet 410. The computers 415A, 415B, and 415C may have any configuration consistent with the present invention. Internet 410 may provide a communication medium that routes information between computers 415A, 415B, and 415C connected thereto. Nevertheless, the fingerprint sensors 70A through 70C generally integrated with associated computers 415A, 415B, and 415C employing the fingerprint and feature verification/authentication techniques consistent with the present invention may be used on other wide area networks (WANs) as well as local area networks (LANs), network protocols including Transmission Control Protocol/Internet Protocol (TCP/IP), and other communication media.

The embodiments described next are examples of how the present invention can be implemented and employed. Variations will be obvious to persons of ordinary skill in the art given the disclosure of the invention herein. The scope of the invention is not limited by the specific examples included herein.

Trackball Embodiments

Figure 6:
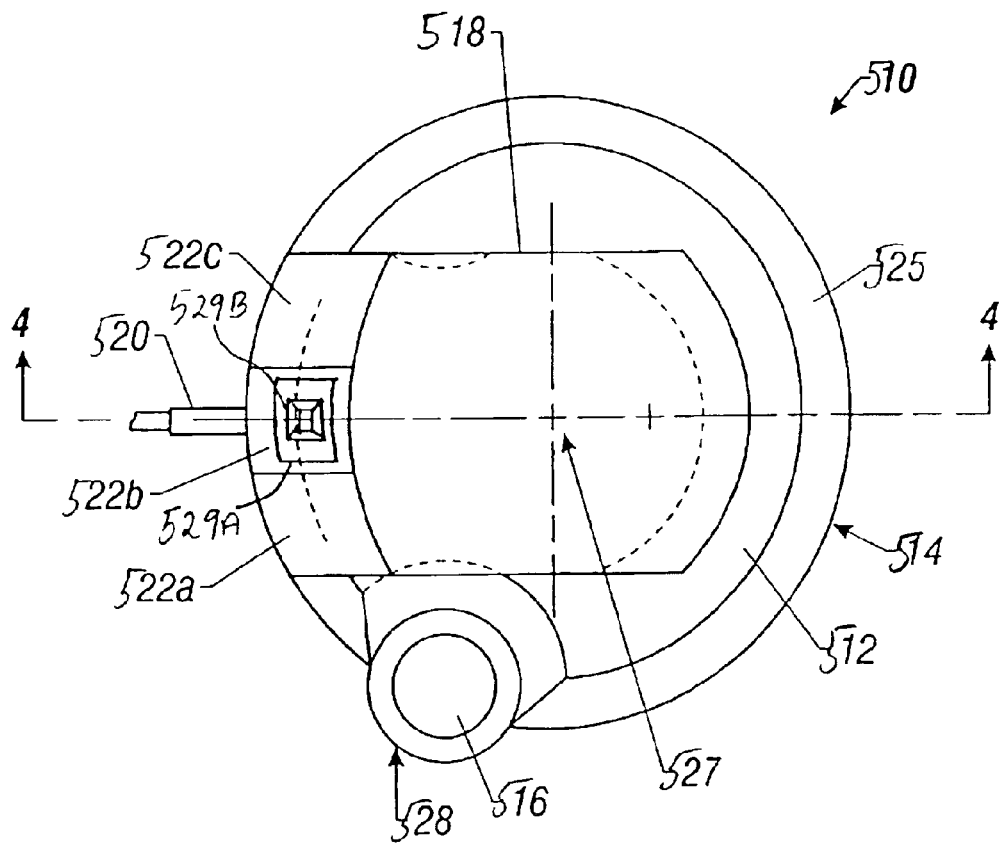
FIGS. 6, 7, and 8 are a top view, a side view, and a rear view, respectively, of one embodiment of a computer pointing device in accordance with the present invention.
Figure 7:
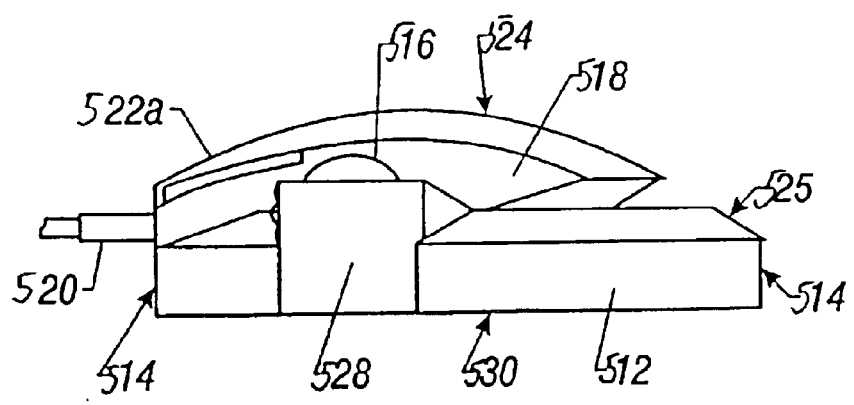
Figure 8:
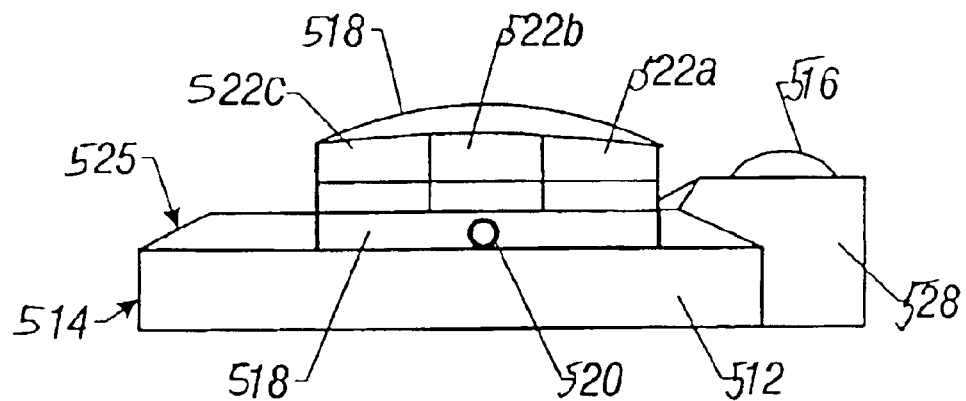

FIG. 6, FIG. 7, and FIG. 8 illustrate a top view, a side view, and a rear view, respectively, of a trackball embodiment of the present invention. Referring specifically to FIG. 6, a computer trackball pointing device 510 includes a base 512 which is substantially circular in shape and has a generally circular perimeter 514. It is preferably approximately 6 inches in diameter, weighs approximately 2 pounds, and is constructed generally of heavy duty plastic, although other dimensions are plausible. A chamfered surface 525 is formed between the top surface of base 512 and the perimeter surface 514. A trackball 516 is mounted off-center on the base 512 within a housing 528 formed on the base at a location intersecting the generally-circular perimeter surface 514. An upper section 518 is connected to the base 512 and includes, for this embodiment, three user-depressable buttons 522A, 522B and 522C formed substantially on a top surface 524 of the upper section 518. An interface 520 connects between the computer trackball pointing device 510 and an attached computer system, or other electronic system.

A fingerprint sensor 529A or other suitable biometric sensor is mounted, for this embodiment, within the center button 522B within the upper section 518 which is a location such that when operating the trackball pointing device 510 in a normal manner, a user's hand rests naturally in a position to place the second finger of the user's hand (i.e., the "middle" finger) in proximity and readable by the fingerprint sensor located below user depressable button 522B. The arrangement is well suited for all users regardless of hand size. The trackball pointing device 510 is adaptable for both right-handed and left-handed users because the upper section 518 is rotatably connected to the base 512 so that the trackball is positionable to either a position leftward or a position rightward of the upper section. The axis of this rotation is indicated at location 527 and provides for a symmetrical positioning of trackball 516 on either the left side or the right side of upper section 518.

The fingerprint sensor 529A may comprise a receiving portion 529B that is configured to accept an authentication article (not shown). Preferably, the fingerprint sensor 529A is mounted within the upper section 518 for detecting one or more predetermined features of the authentication article and for reading at least a portion of a fingerprint of a user's finger in response to the finger positioned adjacent to the fingerprint sensor 529A and the authentication article disposed in proximity to the receiving portion 529B and readable by the fingerprint sensor 529B.

The pointing device 510 may further include a feature detection sensor (not shown) in operative relation with the fingerprint sensor. The feature detection sensor detects the one or more predetermined features, or any combination thereof of the authentication article. In other words, the feature detection sensor reads a featureprint of the authentication article including a precious gem such as a diamond. In one embodiment, the featureprint may include a weight parameter for the weight, a size parameter for the size, and an exterior surface profile parameter for the shape or form of the diamond as the predetermined features to authenticate the fingerprint.

The pointing device 510 may further include a verification engine in operative relation with the computer system, the fingerprint sensor 529A, and the feature detection sensor for determining an identity of the user. The fingerprint sensor 529A may provide a first signal to the verification engine, which is derived from the portion of the fingerprint. Likewise, the feature detection sensor may provide a second signal to the verification engine, which is derived from at least one of the one or more predetermined features of the authentication article.

The verification engine may comprise a database having a user storage, an authorization profile storage, and an audit log storage. The verification engine may further comprise a comparator engine for comparing the first signal indicative of the at least portion of the by fingerprint with a first authentication signal corresponding to a stored copy of the fingerprint within the database. The comparator engine may compare the second signal indicative of the at least one of the one or more predetermined features of the authentication article with a second authentication signal corresponding to a stored copy of the one or more predetermined features of the authentication article within the database to provide an authorization signal for a secured application which is communicatively coupled to the computer system. The authorization signal may selectively provide an access to the secured application to the user.

In one embodiment, the fingerprint sensor 529A is located beneath a particular one of the button positions. And the fingerprint sensor 529A includes a capacitive imaging array located at the particular button position contactable by the user's finger so that the user's fingerprint may be imaged by the capacitive imaging array. Alternatively, the fingerprint sensor 529A can be incorporated into an operable button located at the particular button position. The fingerprint sensor 529A may include an optical imaging array and the particular button position includes a transparent material through which the user's fingerprint may be imaged by the imaging array. The pointing device 510 may further comprise one or more additional biometric sensors in operative relation with the fingerprint sensor 529A.

Referring now to FIG. 7, the bottom surface 530 of the base 512 is substantially flat and may include cushioning pads (not shown) such as low-profile self-adhesive rubber feet, or some other non-scratching surface treatment. The top surface 524 of the upper section 518 is shown, for this embodiment, as a substantially uniformly curved, convex surface which provides a comfortable surface for a user's palm and lower finger regions to rest comfortably upon the computer trackball pointing device 510. Referring specifically to the read view shown in FIG. 8, the interface 520 is shown as a cabled interface passing through the rear surface of the upper section 518. The flat bottom surface 530 of base 512, particularly when implemented with a reasonable large diameter, allows the computer trackball pointing device 510 to easily be placed on a user's lap, or on a soft surface such as a bed, rather than requiring a hard surface such as a desktop.

To rotate the position of the trackball 516 from one side to the other, the computer trackball pointing device 510 is elevated from the surface upon which it rests, the upper section 518 is maintained in a direction pointing away from the user (the interface 520 pointing away from the user) and the base 512 is rotated upon axis 527 sufficiently to cause the trackball 516 within housing 528 to be moved from, for example, the left side of the upper section 518 (as is indicated in FIG. 6) to the right side of upper section 518.

Figure 9:
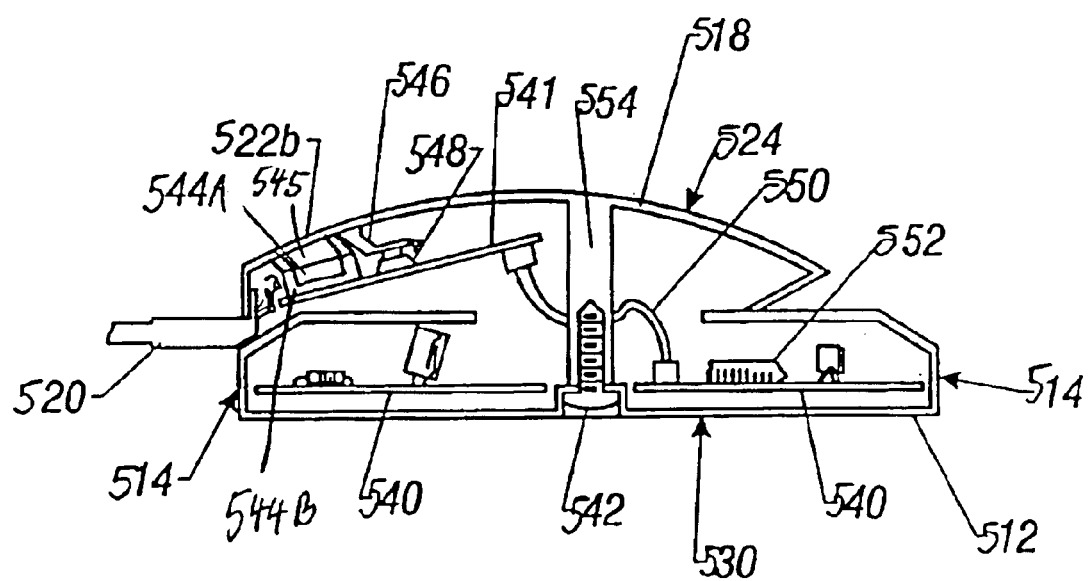
FIG. 9 is a cross-sectional view of the embodiment shown in FIG. 6.

Details of the rotating connection which provides this capability as well as other internal details of the trackball pointing device 510 are shown in cross-section in FIG. 9. Center column 554 is formed as part of the upper section 518 and provides the axis point for the base 512 to rotate with respect to the upper section. Screw 542 (and optionally a washer, not shown) fasten the upper section 518 to the base 512, as well as provide the axis of rotation for the base 512. Interface 520 is now more clearly illustrated as being connected to the upper section 518 so that when used by either right-handed or left-handed users, and when the three buttons are positioned away from the user (i.e., in a rearward direction), the interface is held and pointed in the same direction even as the base is rotated either leftward or rightward of the upper section. Lower circuit board 540 is shown providing a suitable carrier for necessary electronics to implement the functionality required of the computer trackball pointing device 510. For example, integrated circuit 552 is shown attached to a lower printed wiring board 540 (PWB), and an upper PWB-41 is shown electrically interconnected by interface cable 550 to the lower PWB-40. The upper PWB-41 includes a depressable switch 548 and a fingerprint sensor 544A. In this embodiment, user depressable switch 522B is formed of a transparent material through which the fingerprint sensor (which may be an optical CCD sensor) may view the fingerprint of a user whose finger rests upon the surface of transparent button 522B. When depressed by a user, the button 522B causes switch 548 to be depressed by linkage 546. This allows the center button 522B to be an operable button, able to sense when a user depresses the button and to communicate such information to an attached electronic system. But the computer trackball pointing device 510 also provides, by way of the fingerprint sensor 544A viewing the fingerprint of the user through the transparent material forming button 522B, and at the same time, a scan of the user's fingerprint. This affords the capability of identifying or authorizing the particular user. When connected to an attached electronic system, this trackball pointing device 510 provides for the ability to read the fingerprint of a user, even as the user is using that very finger to make input selections to the attached electronic system.

The fingerprint sensor 544A may comprise a receiving portion 545 that is configured to accept an authentication article (not shown). Preferably, the fingerprint sensor 544A is mounted below the upper section 518 for detecting one or more predetermined features of the authentication article and for reading at least a portion of a fingerprint of a user's finger in response to the finger positioned adjacent to the fingerprint sensor 544A and the authentication article disposed in proximity to the receiving portion 545 and readable by the fingerprint sensor 544A.

The pointing device 510 may further include a feature detection sensor 544B in operative relation with the fingerprint sensor. The feature detection sensor 544B detects the one or more predetermined features, or any combination thereof of the authentication article. In other words, the feature detection sensor 544B reads a featureprint of the authentication article including a precious gem such as a diamond. In one embodiment, the featureprint may include a weight parameter for the weight, a size parameter for the size, and an exterior surface profile parameter for the shape or form of the diamond as the predetermined features to authenticate the fingerprint.

Those skilled in the art will appreciate that the feature detection sensor 544B can be readily devised to read the featureprint of the authentication article. For example, the feature detection sensor 544B may include a combination of known detectors such as a weight detector for measuring the weight of the authentication article, and an optical detector for sensing the shape, size or form of the authentication article.

It should also be appreciated when looking at the computer input trackball device depicted in FIGS. 6 through 9 that when the upper section 518 is rotated such that the trackball 516 is located leftward of the upper section 518, a right-handed user's hand when operating the device in a normal manner rests naturally in a position to place the second finger of the user's right hand in proximity and readable by the fingerprint sensor 544A and the user's right thumb in a position to comfortably move the trackball 516. Moreover when the upper section 518 is rotated such that trackball 516 is located rightward of the upper section 518, a left-handed user's hand when operating the device in a normal manner rests naturally in a position to place the second finger of the user's left hand in proximity to and readable by the fingerprint sensor 544A and the user's left thumb in a position to comfortably move the trackball 516.

Generally speaking, the fingerprint sensor 544A conveys information associated with the user's identity to the computer system attached by way of interface 520. This information may include a signal indicating whether the user is authorized to access the computer system. For example, a storage means such as an electronic memory may be included within the trackball pointing device 510 for storing information associated with the identity of at least one authorized user which is received from the attached computer system. Thereafter the fingerprint sensor 544A utilizing such storage, within the trackball pointing device 510, of authorized users may independently make a determination that a particular user attempting to use the device is an authorized user upon comparison of actual measured fingerprint with stored information from the authorized list. In other instances the information associated with the user's identity may include a signal indicating the attributes of the user's fingerprint so that the attached computer or other electronic system may determine whether the user is authorized to access the computer system. Examples of such attributes of the user's fingerprint include a digitized scanned image of the user's fingerprint, compressed representations of the user's fingerprint in digital or other form including a digital representation of the minutia of the user's fingerprint.

Other embodiments of similar input devices incorporating a biometric sensor may include a variety of different button positions in which the fingerprint sensor or other biometric sensor is located below a particular one of the button positions. FIG. 6 shows an pointing device 510 having three button positions, each of which is depicted to illustrate an operable button (e.g., buttons 522A, 522B, and 522C) at each of the button positions, but a particular button position may have either an inoperable button at such a location or no button whatsoever at the location. Moreover, the fingerprint sensor 544A or other biometric sensor may be located below a button position, whether operable or not, or at a location not beneath a button position. In another embodiment a three-button mouse includes a fingerprint sensor 544A disposed beneath an operable or inoperable center button position as is similarly depicted within the upper section 518 of the computer trackball pointing device 510 shown in FIG. 6.

While the base of the computer trackball pointing device 510 is shown in FIG. 6 as being rotatably connected to the upper section 518, other variations are equally plausible. For instance, a fixed connection could be easily implemented as a single-piece construction and could be configured for a right-handed or a left-handed user rather than as a single device which provides equal suitability to either a right-handed or a left-handed user. Likewise, similar moveable connections rather than a rotational connection are also contemplated which would allow a trackball device to be positioned in at least one of two locations such that suitable use for both right-handed and left-handed users may be achieved. The interface 520 which is depicted in FIG. 6 as being a wired interface may also be implemented as a wireless interface and could include an infrared, a radio frequency or any variety of other wireless techniques. The interface may instead include a wireless interface having a transducer located at a rear surface of the upper section 518. Fingerprint sensor 544A may be implemented as an optical imaging array as depicted in FIG. 9 in which the user's fingerprint is imaged through a transparent material forming button 522B. Such optical imaging arrays are commercially available, including from Suni Imaging Systems, Mountain View, Calif., and from Keytronics, Washington, D.C. Alternatively such a fingerprint sensor 544A may also be implemented as a capacitive imaging array, such as the FingerLoc™ series of sensors, available from the Harris Corporation, Melborne, Fla.

Figure 10:
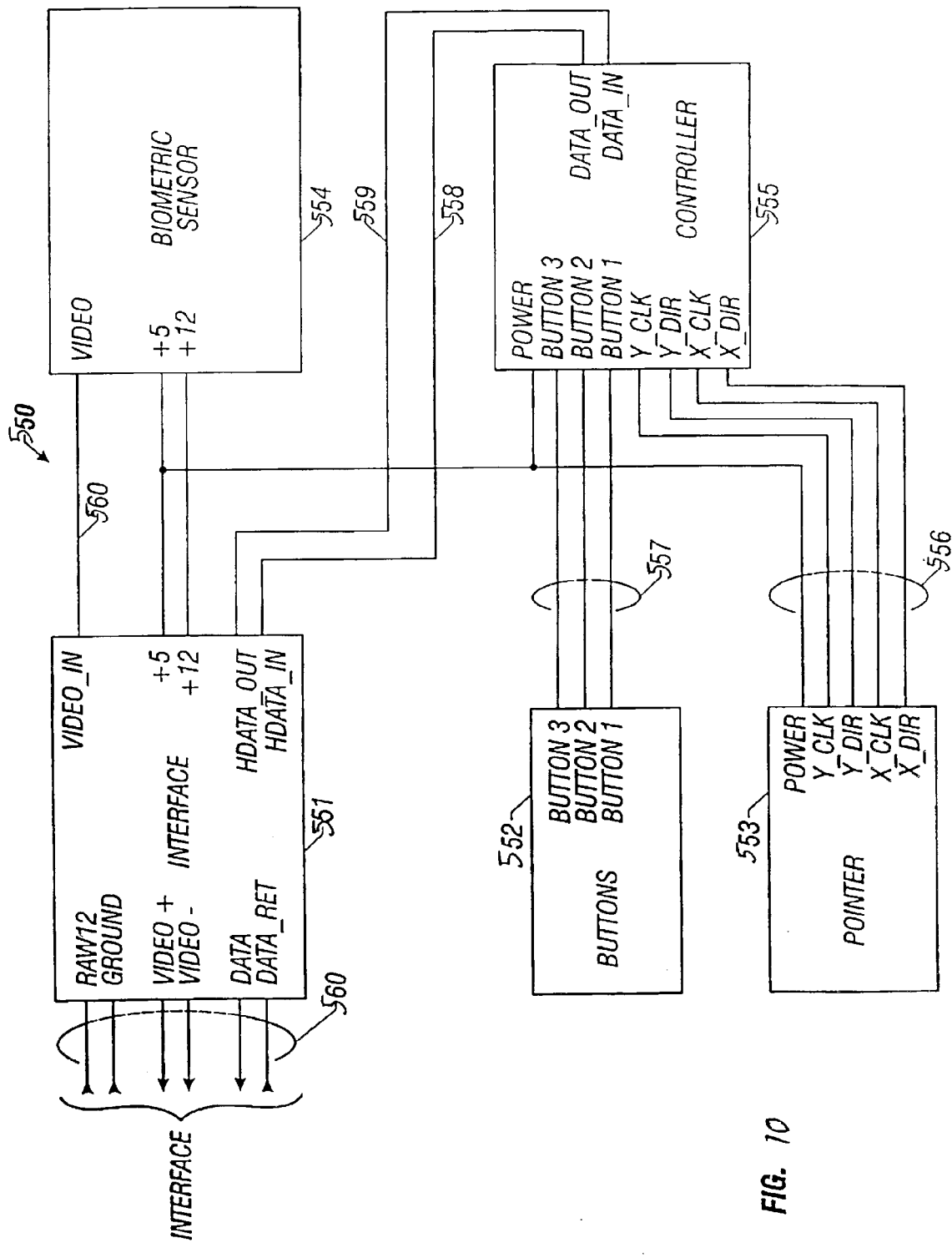
FIG. 10 is an electrical block diagram of an embodiment of electronic circuitry useful within the computer pointing device shown in FIG. 6.

FIG. 10 is an electrical block diagram of one embodiment of an electronic sub-system 550 which may be implemented within the computer trackball pointing device 10 shown in FIG. 6. The sub-system 550 includes an interface 551 which communicates to an attached computer system or other electronic system, a controller 555 for general control functions and for implementing traditional computer "mouse" functions, a button block 552 which includes traditional computer mouse user-depressable buttons, a pointer 553 which, in this case, includes circuits for implementing a computer trackball pointing device, and CCD camera 554 which provides a capability of visually scanning a user's fingerprint.

The interface 551 includes a group 560 of wires which provides communication to and from an attached system. These wires are preferably implemented using an unshielded twisted pair (UTP) cable having three twisted pairs of wires for connecting, using suitable connectors, to an attached computer or other electronic system. The group 560 of wires includes power terminal RAW12 and ground terminal GROUND for receiving power and ground from the attached system, differential video signal lines VIDEO+ and VIDEO− for conveying a differential video signal to the attached system, and serial data lines DATA and DATA_RET for respectively conveying serial data to and from the attached system. In other embodiments, a wireless interface, such as an infrared or RF interface may also be used. On-board batteries may used to power the pointing device in lieu of power cables.

The button block 552 includes three user-depressable buttons (not shown) and conveys a signal for each button (BUTTON1, BUTTON2, and BUTTON3) in a group 557 of wires to the controller 555. Other numbers of buttons are also possible, including one, or two. The pointer 553 includes the trackball position sensor and communicates positional information using signals X_CLK, X_DIR, Y_CLK, and Y_DIR to the controller 555 via the group 556 of wires. The pointer 553 may also include a computer mouse position sensor. Power is also received from the interface 551 via a wire within the group 556 of wires.

The controller 555 receives power from the interface 551 via one of the wires 556, and also sends and receives serial data to/from the interface 551 via wires 559 and 558, respectively. Controller 555 provides for a point-and-click selection capability and data transfer capability to an attached system, to provide the traditional capabilities associated with a computer mouse or trackball.

Biometric sensor 554, such as a CCD camera, receives power from the interface 551 and conveys (for this example) a video signal to the interface 551 via wire 560. In other embodiments, other types of biometric sensors may be used, such as an capacitive fingerprint sensor rather than an optical sensor. One such sensor is the FingerLoc.TM. series of capacitive imaging array sensors, available from the Harris Corporation, Melborne, Fla. Additional control and data signals (not shown) between the interface 551, the controller 555, and the biometric sensor 554 are to be expected in other embodiments.

Figure 11:
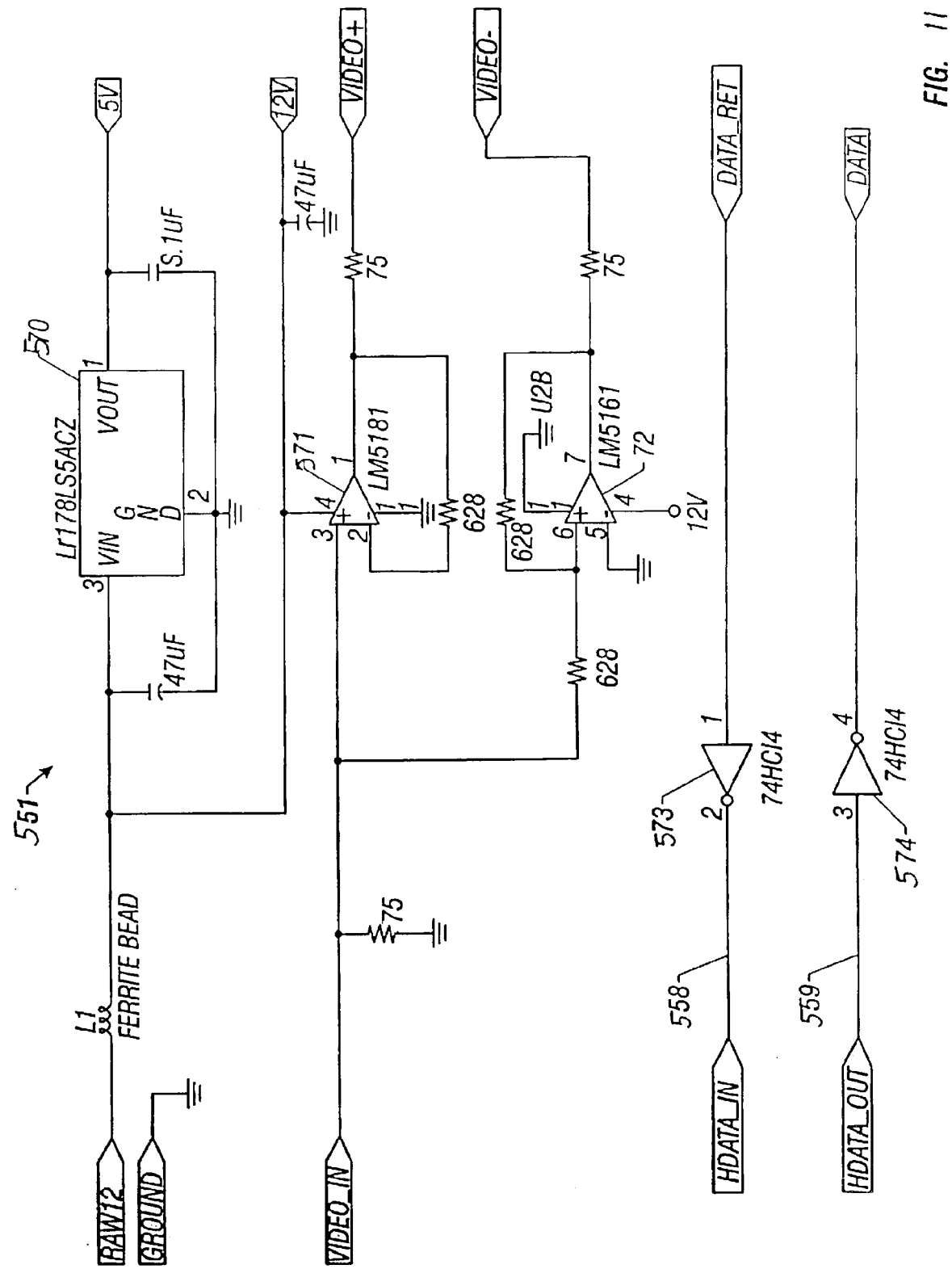
FIG. 11 is an electronic schematic drawing of interface circuitry depicted in FIG. 10.

Referring now to FIG. 11, one embodiment of the interface 551 includes a voltage regulator 570 for generating a +5 volt power supply from an incoming +12 volt supply, along with various related filtering capacitors and a ferrite bead. Twin video amplifiers 571, 572 produce a differential video signal from a single-ended signal received from the biometric sensor 554. Video amplifier 571 is configured as a unity gain amplifier with a 75 ohm output impedance, and video amplifier 572 is configured as a negative unity gain amplifier, also with a 75 ohm output impedance. Serial data buffers 573, 574 provide simple buffering to an already serial signal received from the controller 555 (e.g., HDATA_OUT) or received from the attached system (e.g., HDATA_IN).

Figure 12:
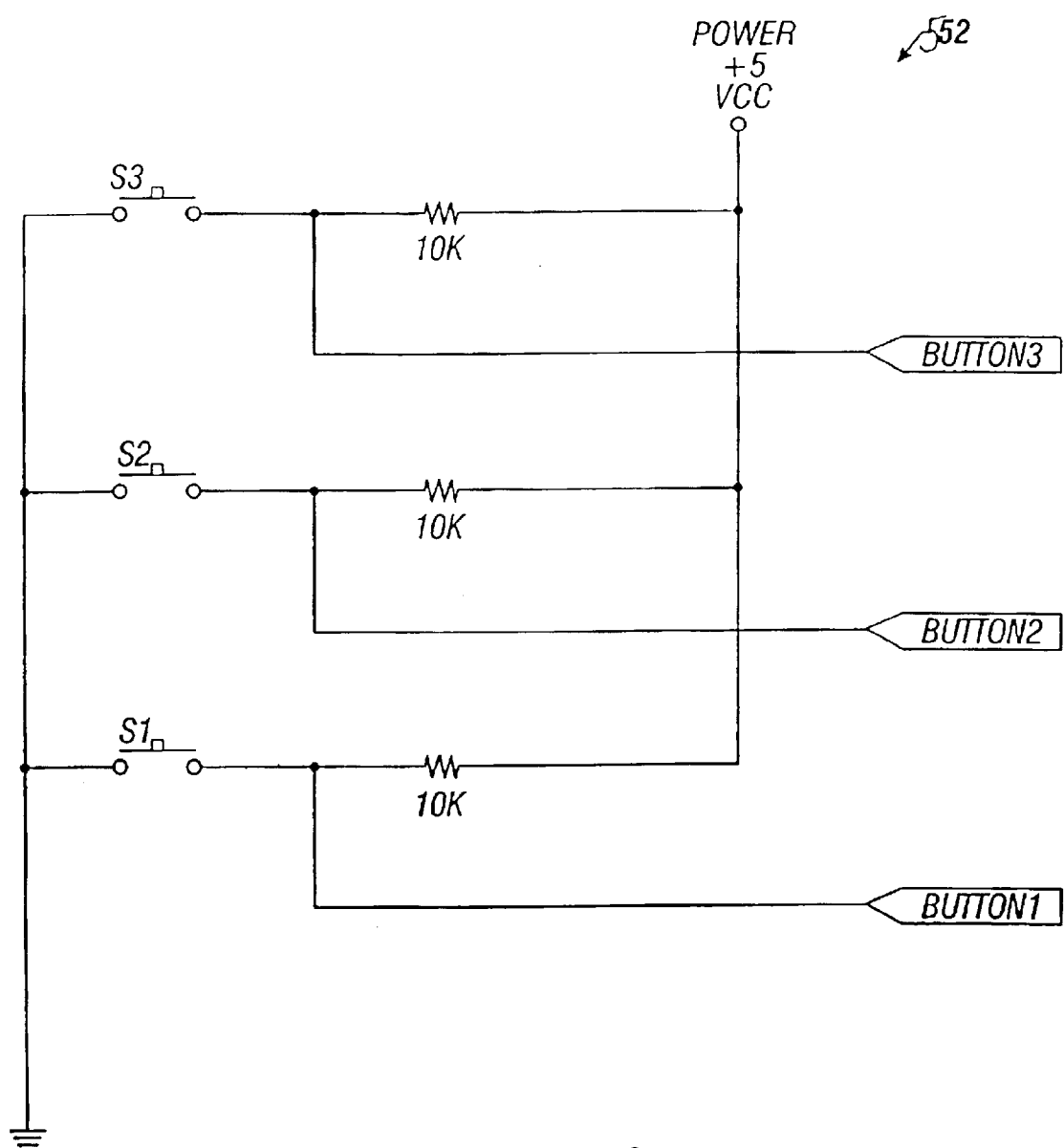
FIG. 12 is an electronic schematic drawing of user-button circuitry depicted in FIG. 10.
Figure 13A:
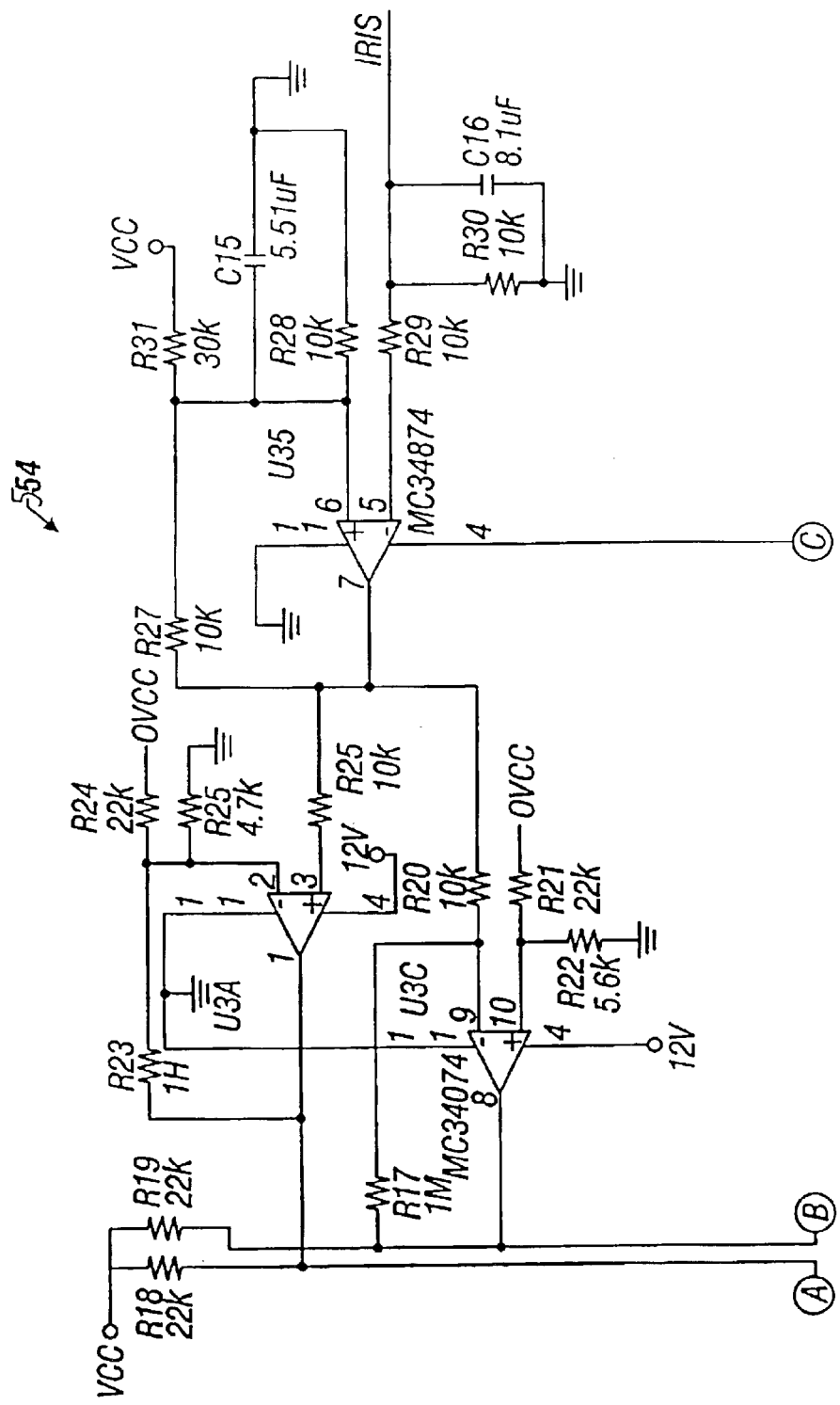
Figure 13B:
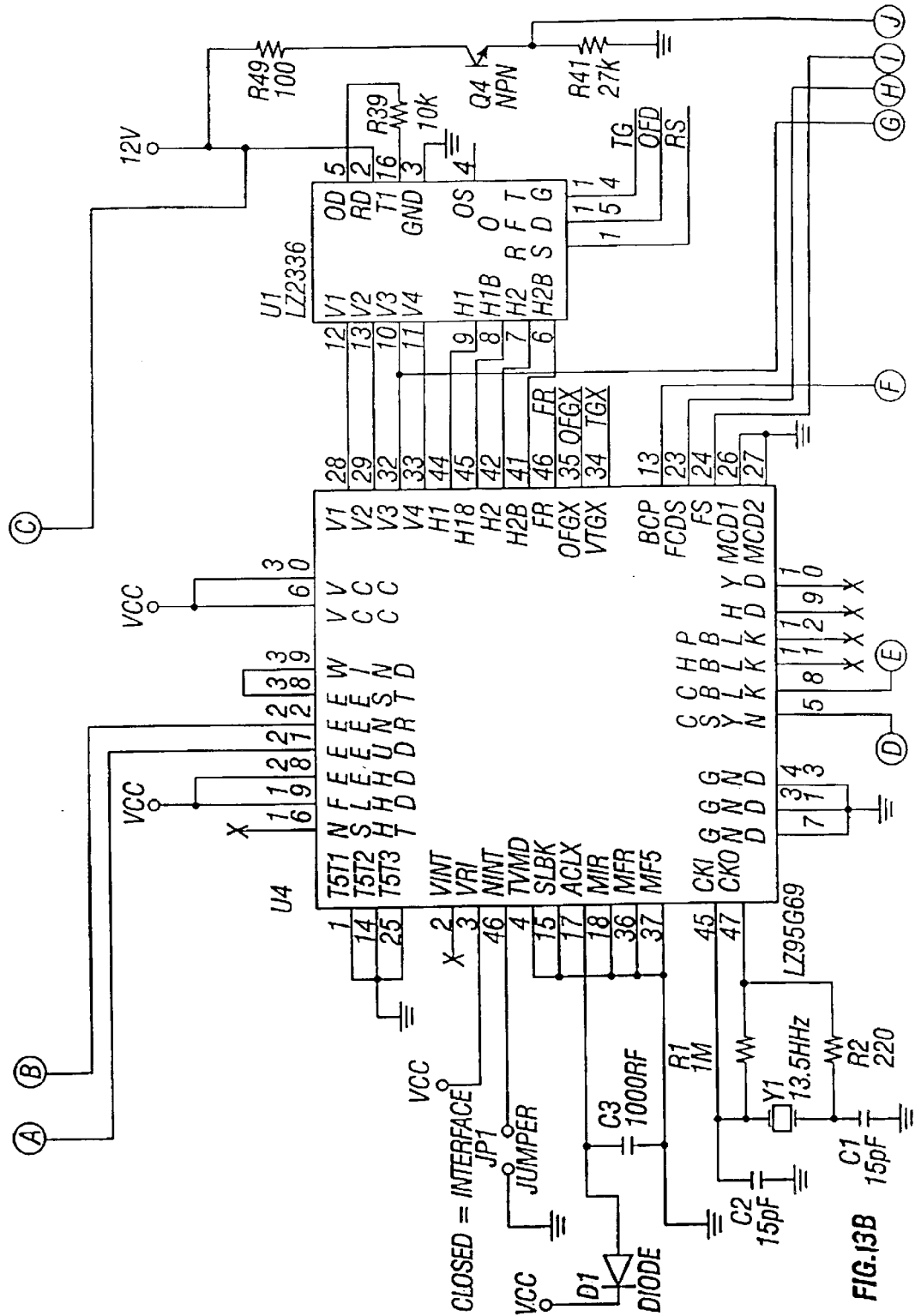
Figure 13C:
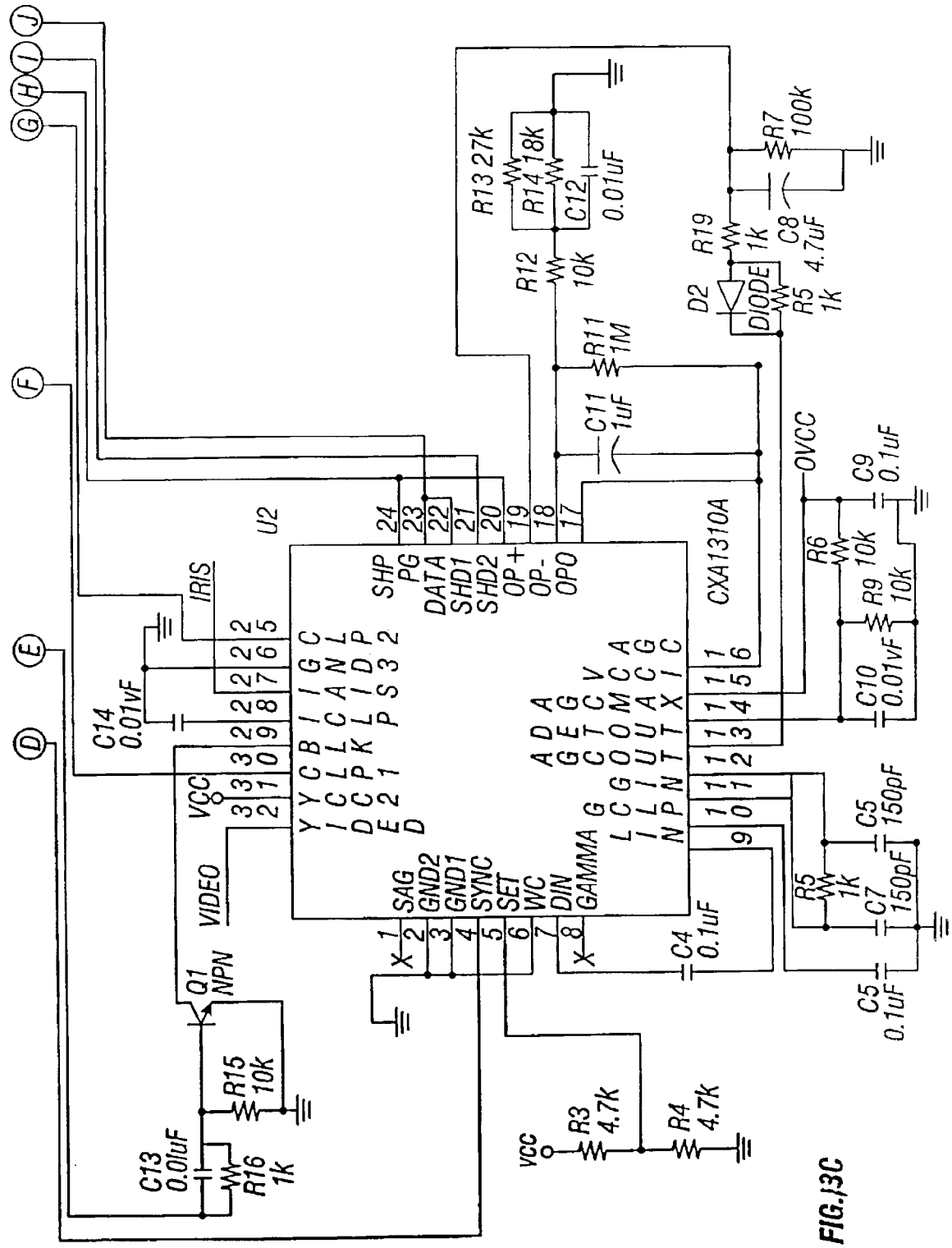
Figure 13C:
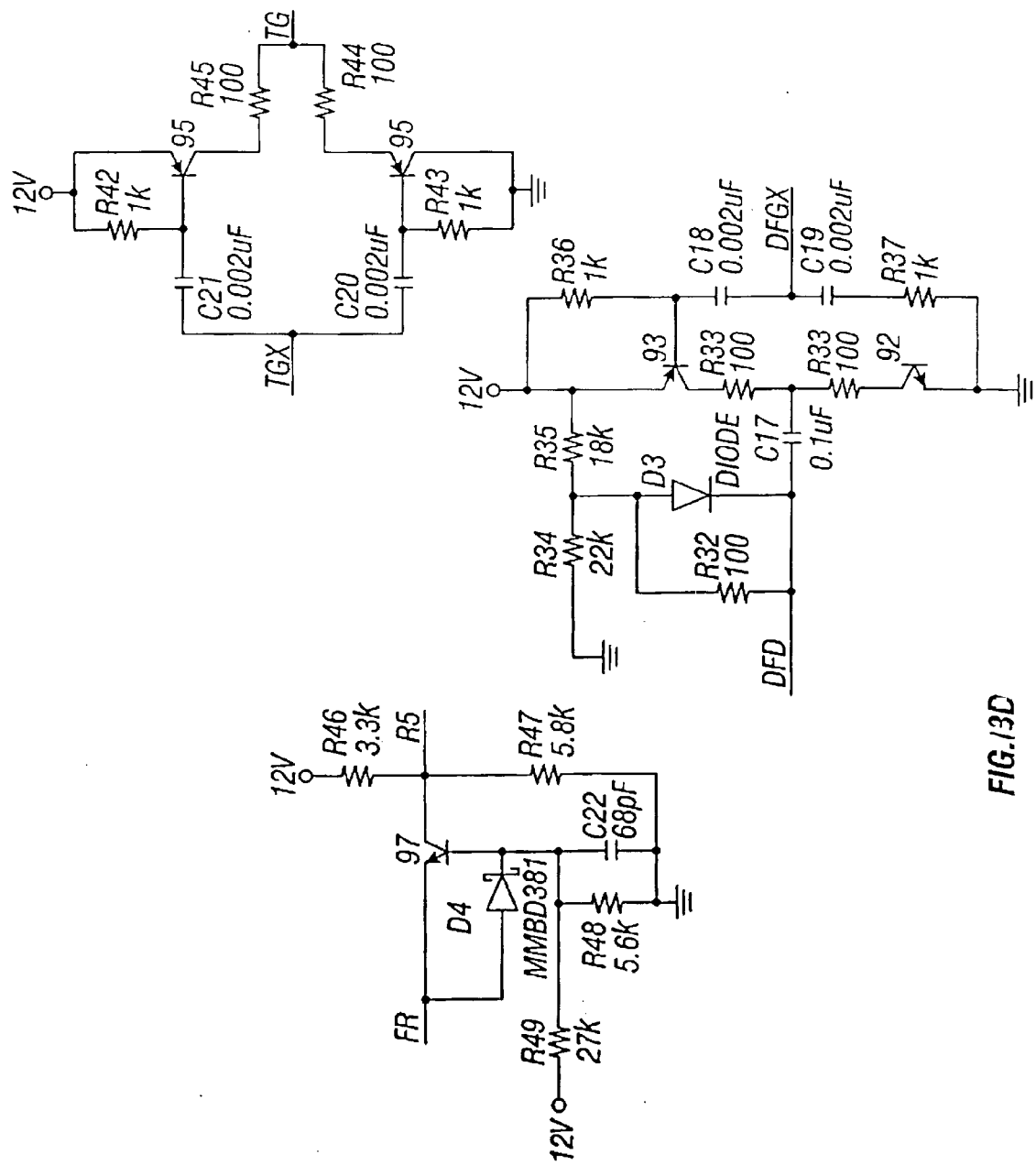

FIG. 12 depicts one embodiment of the button block 552. A respective pull-up resistor to a +5 power supply voltage is momentarily connected to ground by a respective user-depressable switch, and which generates the respective button signal.

FIG. 13 illustrates one embodiment of a biometric sensor 554 incorporating a CCD camera system which may be implemented within a pointing device, such as within the computer trackball pointing device 510 shown in FIG. 6.

System Embodiments

Figure 14:
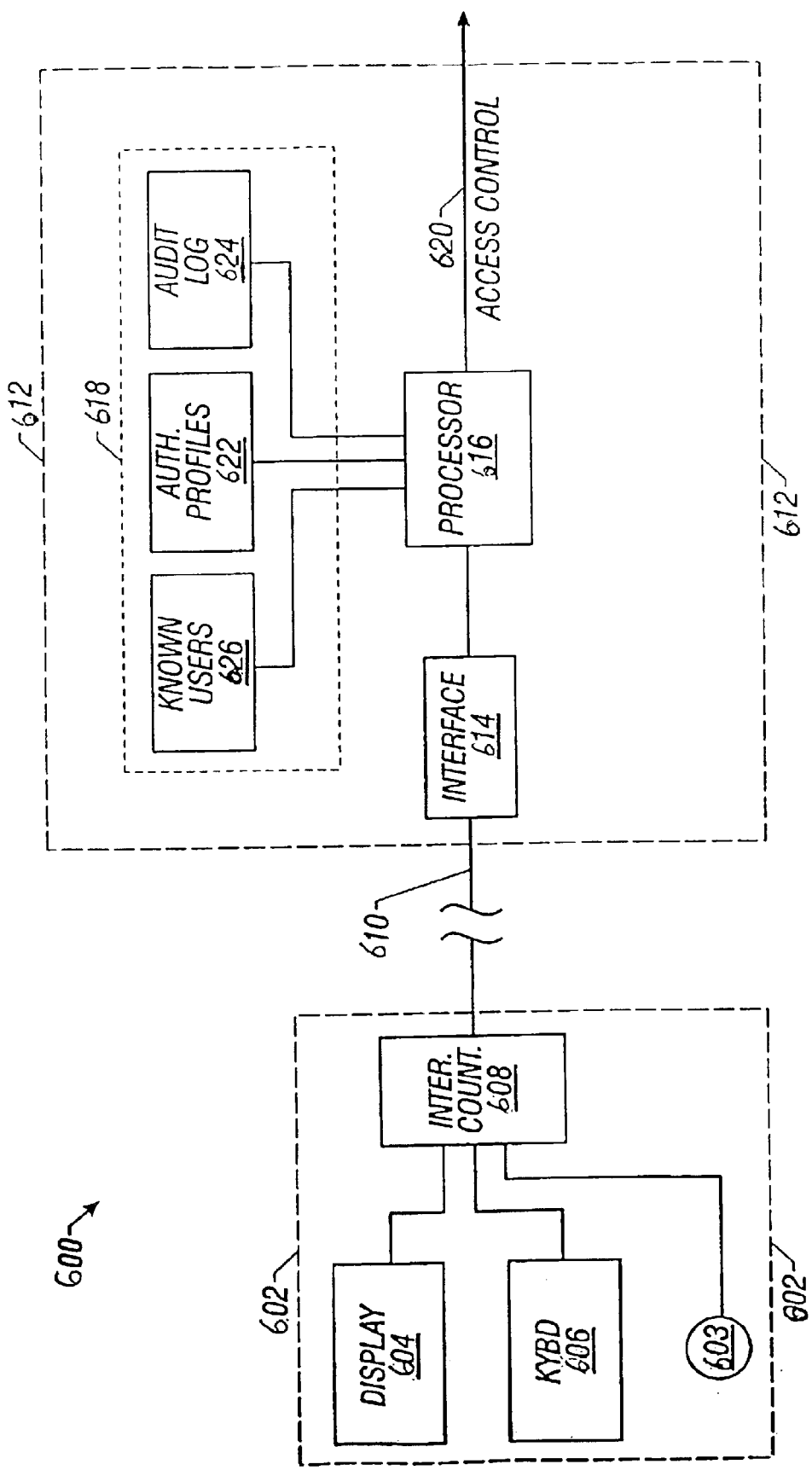
FIG. 14 is a block diagram of a system incorporating the computer pointing device shown in FIG. 6.

FIG. 14 illustrates a system 600 which includes a user interface terminal 602 connected via a connection 610 to a computer verification engine 612. User interface terminal 602 includes a biometric input device 603 (e.g., a computer trackball pointing device 510), a keyboard 606, a display 604, and an interface controller 608. The computer verification engine 612 includes an interface controller 614, a processor 616, and memory 618. The processor 616 generates an access control signal 620 when user identification and/or authorization has been confirmed and access to a particular system or feature (not shown) is warranted. Such an access-controlled system may reside within the computer verification engine 612, or may be external to the computer verification engine 612, and may include access to physical equipment or electronically stored or transmitted information.

Memory 618 includes known user storage 626 for storing the identification information, such as a fingerprint "signature," of users already known to the system 612. Memory 618 also includes authorization profile storage 622 for storing authorization information (e.g., permissible dates/times/functions/transactions/machines) for each user already known to the system 612. Memory 618 also includes an audit log storage 624 for storing successful and unsuccessful system accesses, as well as transaction information for users who successfully gain access to the system. The authorization profile storage 622, audit log storage 624, and known user storage 626 may be implemented together as one or more digital memory devices, or may be implemented using separate memory technologies, such as writable CD-ROM, magnetic disk, optical disk, flash memory, and other well known technologies. Advantageously, one or more of the authorization profile storage 622, the audit log storage 624, and the known user storage 626 may store encoded information, and may be implemented as an electronic memory device connected to the system 612, such as a removable PC card memory device. This affords, for example, an authorized user to carry his profile in a removable device and allows gaining access to any system to which the removable device is connected.

A user initializes the verification engine by first using the biometric input device 603, such as the computer trackball pointing device 510, to sense the biometric information (in this example, a fingerprint), to digitize it, optionally compress it or otherwise extract a "signature" representative of that user's fingerprint, and store the information, along with other user identifying information, into the known user storage 626. The stored "signature" is then used to identify and/or verify subsequent attempted accesses of the system 600.

Additionally, information is stored into authorization profile storage 622, preferably by one who controls access to the system, such as a system administrator, a hotel cashier, or others, to specify which user may perform which transactions at what times and dates, etc. Thereafter, when a user attempts to access the system, his or her fingerprint is read by device 603, and compared with the known user storage 626 and the authorization profile storage 622 to determine whether to allow the particular user to perform the function requested. If so, the processor 616 then drives the access control signal 620 and logs the particular transaction, time, date, and identification information for the user. The identification of the user is verified continuously as long as the user is in contact with the biometric input device 603 (for this example, the computer trackball pointing device 510). Each time the user inputs a system request, the verification process must be completed and maintained prior to continuing the use of the device being accessed. Verification times of several seconds are achievable with available processors and algorithms. If the use of the accessed device is discontinued, the verification process must be completed once prior to gaining access to the desired device, and use must be maintained for continued access.

If, at any time, a biometric reading is taken which does not match any user having a profile stored in the known user storage 626, access is denied and an audit log may be stored within the audit log storage 624 to provide a record of unsuccessful access attempts. Such an audit log entry may include time, date, attempted transaction, and a copy of the user identification information determined by the biometric device, such as a scanned fingerprint image, a fingerprint minutia representation, or others. Alternatively, if the user identifying information from the biometric device is matched with a user found in the known user storage 626, but the authorization profile storage 622 indicates that the particular user has requested something for which he or she is not authorized, then access is also denied and an audit log entry is also created in the audit log storage 624. This entry may include time, date, attempted transaction, and an indication of the user's identity, such as a name, a photographic image, or others.

Such an audit log affords a significant capability to detect internal fraud and other unauthorized use by persons known to the system, and indeed authorized to perform some tasks, but not authorized for the task or function at the attempted time or date. For example, assume the system 600 is configured to provide access control to a cash register machine. Assume Sally and Mary are both registered employees known to the system and each has an entry in the known user storage 626. Further assume that Mary is continuously and properly verified during her shift as being authorized to engage in the type of transactions normally performed at her cash register. But if, during one of Mary's short work breaks, Sally tries to access the cash register during a time she is unauthorized, the system logs her unsuccessful attempt along with her name, picture, fingerprint, or some other identifying information. If Sally is unknown to the system altogether (i.e., no entry in the known user storage 626), then the audit log created may include, as well, as much identifying information, such as a fingerprint image, as possible to help law enforcement officials or others in identifying the person responsible for the unsuccessful access.

The computer trackball pointing device 510 may generate a scanned image of a users fingerprint, which is communicated to a host system for verification processing. Alternatively, the verification capability may reside within the computer trackball pointing device 510 along with authorized user keys to allow the pointing device to determine whether a user is authorized, without significant data transfers between the computer trackball pointing device 510 and the attached system. For example, the Finger-Loc.TM. series of devices, available from the Harris Corporation of Melborne, Fla., includes a down-loadable local memory for storing fingerprint profiles for up to 100 users, and includes a processor for independently determining whether an observed fingerprint matches one stored within the local memory, without intervention from an attached host processor. In such an embodiment, the computer trackball pointing device 510 may therefore include biometric identification software, as well.

Combined Identification/Substance Detection Embodiments

In some embodiments of a pointing device employing an optical scanning capability, such as a color CCD imager, it may be possible to determine the blood alcohol content of the user simultaneously with scanning the fingerprint to determine the identification of the user. Such a combined identification/sobriety sensor would only allow access to an authorized person if he/she was sober. This could have tremendously beneficial applications in security access to military bases, power plants, industrial machinery areas, employer liability concerns, and others. A sensitive patch material is commercially available which, when in contact with a person's skin, changes color in response to chemical variations in the user's perspiration, and which is correlated to the person's blood alcohol content. A small patch of such material, if placed over the transparent window, allows a user's finger to be partially visible (and the patch could be sized small enough to preserve enough fingerprint information) for identifying a person, and yet still be large enough to sense perspiration variations, and change color appropriately enough to determine the blood alcohol content of the user. Such an arrangement would make the combined identification/sobriety sensor difficult for two people to fool. If the "authorized" person was drunk, and another person, a "thief," was sober, the system would still be hard to defeat. Such a system may be hard enough to defeat to permit unattended sobriety/identification terminals, for remote access control, which ensures a sober user, not just an authorized user. Materials, which may be used to detect other substances than alcohol, such as cocaine or other narcotics, may also be available and incorporated advantageously as described above.

Ten Finger Identification With Single Sensor

A pointing device such as a computer trackball pointing device 510 as shown in FIG. 6, or any other device which has only one fingerprint sensor, may be used with up to all ten fingers to decrease the statistical chance of authentication error. For example, a user during the initialization sequence may be requested to place each of his/her fingers on the single fingerprint sensor so the system may learn each of the user's ten fingerprints. Then, periodically or at random, frequent intervals, the user may be requested by the system to place a certain finger on the sensor before the system proceeds. Also, such a system may request all tens fingers be presented sequentially to the sensor after a predetermined period of inactivity. The system may also demand all ten fingers be sequentially placed upon the fingerprint sensor before granting initial access, or after a predetermined period of user inactivity.

Foot-Print Embodiment

Embodiments of the present invention may include adaptations which allow a foot-operated pointing device which identifies a user by matching foot prints. A position sensor may be implemented in a much larger size to be easily operable with one or both feet, while large user-depressable buttons may be engaged with one or more toes, during which time one or more sensors scans portions of the user's foot or feet.

Other Embodiments

It should be appreciated that a mouse position sensor may be used instead of a trackball position sensor by using the teachings of this disclosure.

A fingerprint sensor may also be placed below a transparent trackball to allow reading a user fingerprint through the trackball. Distortions caused by the curvature of the trackball may be accounted for by software transformations of scanned fingerprint image data, or by merely "teaching" the fingerprint of an authorized user by using the same distorted optics.

While the invention has been described with respect to the embodiments set forth above, the invention is not necessarily limited to these embodiments. For example, while recited using a typical context of use with a computer system, a computer pointing device may be attached to a wide variety of other electronic systems which are essentially computer systems or computer-controlled systems, such as set-top boxes for television, security systems, and others. Moreover, a pointing device as described herein is particularly well suited for use with a system along with other biometric sensors, such as a biometric retinal scanner which may be used for identification/authentication and/or substance detection, as well as with a removable PC card memory storage to store biometric information for the authorized user. Accordingly, other embodiments, variations, and improvements not described herein are not necessarily excluded from the scope of the invention, which is defined by the following claims.

Although the present invention and its advantages have been described in detail, it should be understood that various changes, substitutions and alterations can be made to the embodiments herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A pointing device, comprising:
   an interface for operably communicating with a computer system;
   a base;
   a trackball mounted upon the base;
   an upper section, said upper section including at least one button formed substantially on a top surface of the upper section; and
   a fingerprint sensor having a receiving portion that is configured to accept an authentication article, wherein the fingerprint sensor is mounted within the upper section for detecting one or more predetermined features of said authentication article and for reading at least a portion of a fingerprint of a user's finger in response to the finger positioned adjacent to said fingerprint sensor and the authentication article disposed in proximity to the receiving portion and readable by said fingerprint sensor.

2. The apparatus of claim 1, further comprising a feature detection sensor in operative relation with the fingerprint sensor, wherein the feature detection sensor detects the one or more predetermined features, or any combination thereof of the authentication article.

3. The apparatus of claim 2, further comprising a verification engine in operative relation with the computer system, the fingerprint sensor, and the feature detection sensor for determining an identity of the user, wherein the fingerprint sensor provides:

a first signal to the verification engine, the first signal being derived from the portion of the fingerprint, and the feature detection sensor provides:

a second signal to the verification engine, the second signal being derived from at least one of the one or more predetermined features of the authentication article.

4. The apparatus of claim 3, wherein the verification engine comprises:

a database having a user storage, an authorization profile storage, and an audit log storage; and a comparator engine for comparing:

the first signal indicative of the at least portion of the fingerprint with a first authentication signal corresponding to a stored copy of the fingerprint within the database, and the second signal indicative of the at least one of the one or more predetermined features of the authentication article with a second authentication signal corresponding to a stored copy of the one or more predetermined features of the authentication article within the database to provide an authorization signal for a secured application which is communicatively coupled to the computer system.

5. The apparatus of claim 4, wherein the authorization signal selectively provides an access to the secured application to the user.

6. A pointing device as recited in claim 1, wherein the fingerprint sensor is located beneath a particular one of the button positions.

7. A pointing device as recited in claim 6, wherein the fingerprint sensor includes a capacitive imaging array located at the particular button position contactable by the user's finger so that the user's fingerprint may be imaged by the capacitive imaging array.

8. A pointing device as recited in claim 7, wherein the fingerprint sensor is incorporated into an operable button located at the particular button position.

9. A pointing device as recited in claim 6, wherein:

the fingerprint sensor includes an optical imaging array; and the particular button position includes a transparent material through which the user's fingerprint may be imaged by the imaging array.

10. The pointing device of claim 1, further comprising one or more additional biometric sensors in operative relation with the fingerprint sensor.

11. A pointing device, comprising:

an interface for operably communicating with a computer system;

a base;

a trackball mounted upon the base;

an upper section, said upper section including at least one button formed substantially on a top surface of the upper section; and a fingerprint sensor having a receiving portion that is configured to accept an authentication article, wherein the fingerprint sensor is mounted within the upper section for detecting one or more predetermined features of said authentication article and for reading at least a portion of a fingerprint of a user's finger in response to the finger positioned adjacent to said fingerprint sensor and the authentication article disposed in proximity to the receiving portion and readable by said fingerprint sensor; and a verification engine for operably communication with the computer system for determining an identity of the user.

12. The pointing device of claim 11, further comprising a feature detection sensor in operative relation with the fingerprint sensor, wherein the feature detection sensor detects the one or more predetermined features, or any combination thereof of the authentication article.

13. The apparatus of claim 12, wherein the fingerprint sensor provides:

a first signal to the verification engine, the first signal being derived from the portion of the fingerprint, and the feature detection sensor provides:

a second signal to the verification engine, the second signal being derived from at least one of the one or more predetermined features of the authentication article.

14. The apparatus of claim 13, wherein the verification engine comprises:

a database having a user storage, an authorization profile storage, and an audit log storage; and a comparator engine for comparing:

the first signal indicative of the at least portion of the fingerprint with a first authentication signal corresponding to a stored copy of the fingerprint within the database, and the second signal indicative of the at least one of the one or more predetermined features of the authentication article with a second authentication signal corresponding to a stored copy of the one or more predetermined features of the authentication article within the database to provide an authorization signal for a secured application which is communicatively coupled to the computer system.

15. The apparatus of claim 14, wherein the authorization signal selectively provides an access to the secured application to the user.

16. A detector apparatus having a fingerprint sensor having a receiving portion that is configured to accept an authentication article, the fingerprint sensor detecting one or more predetermined features of said authentication article and reading at least a portion of a fingerprint of a user wherein the fingerprint sensor is detachably coupled to binoculars.

* * * * *